US010517267B2

(12) United States Patent
Gordon et al.

(10) Patent No.: US 10,517,267 B2
(45) Date of Patent: Dec. 31, 2019

(54) ANIMAL FEEDING SYSTEM

(71) Applicant: Pet Novations Ltd., Kefar Malal (IL)

(72) Inventors: Tal Gordon, Hod Hasharon (IL); Erel Benyamini, Kfar Sava (IL); Sefi Shachrur, Pardes-Hana Karkur (IL); Dmitry Averbukh, Ramat Gan (IL)

(73) Assignee: Pet Novations Ltd., Kefar Malal (IL)

( * ) Notice: Subject to any disclaimer, the term of this patent is extended or adjusted under 35 U.S.C. 154(b) by 463 days.

(21) Appl. No.: 15/321,255

(22) PCT Filed: Jun. 23, 2015

(86) PCT No.: PCT/IB2015/054702
§ 371 (c)(1),
(2) Date: Dec. 22, 2016

(87) PCT Pub. No.: WO2015/198222
PCT Pub. Date: Dec. 30, 2015

(65) Prior Publication Data
US 2017/0202178 A1    Jul. 20, 2017

Related U.S. Application Data

(60) Provisional application No. 62/015,608, filed on Jun. 23, 2014.

(51) Int. Cl.
*A01K 5/02*    (2006.01)
*A01K 5/01*    (2006.01)

(52) U.S. Cl.
CPC .......... *A01K 5/0275* (2013.01); *A01K 5/0142* (2013.01); *A01K 5/0291* (2013.01)

(58) Field of Classification Search
CPC .. A01K 5/0275; A01K 5/0142; A01K 5/0291; A01K 5/00; A01K 5/02;
(Continued)

(56) References Cited

U.S. PATENT DOCUMENTS 4,421,059 A    12/1983  Cousino
5,105,767 A *   4/1992  Gordon ................ G05D 11/134
                                                119/57.92
(Continued)

FOREIGN PATENT DOCUMENTS

FR    2701353       8/1994
JP    U11976000078   6/1974
(Continued)

OTHER PUBLICATIONS

European Extended Search Report, European Patent Application 15812619.3, dated Nov. 9, 2017.
(Continued)

*Primary Examiner* — John Cooper
(74) *Attorney, Agent, or Firm* — Dekel Patent Ltd.; David Klein

(57) ABSTRACT

A method of feeding an animal includes placing a food container containing animal food and closed with a cover in an animal feeding system, employing the animal feeding system to open the food container and to present the food to an animal for eating and employing the animal feeding system to re-close the food container.

9 Claims, 36 Drawing Sheets

(58) Field of Classification Search
CPC .. A01K 5/0208; A01K 5/0216; A01K 5/0233; A01K 5/025
USPC .......................... 119/57.92, 51.02, 61.5, 63
See application file for complete search history.

(56) References Cited

U.S. PATENT DOCUMENTS

| | | | |
|---|---|---|---|
| 5,649,499 A | 7/1997 | Krietzman | |
| 7,827,935 B1 * | 11/2010 | Addleman | A01K 5/0142 119/51.02 |
| 7,874,265 B1 * | 1/2011 | Addleman | A01K 5/025 119/59 |
| 10,034,453 B2 * | 7/2018 | Neighbors | A01K 5/0208 |
| 10,081,527 B2 * | 9/2018 | Gold | B65B 57/02 |
| 10,244,734 B1 * | 4/2019 | Riley | A01K 5/0291 |
| 2007/0193524 A1 | 8/2007 | Turner | |
| 2007/0294129 A1 | 12/2007 | Froseth | |
| 2008/0289580 A1 | 11/2008 | Krishnamurthy | |
| 2011/0146580 A1 * | 6/2011 | Jalbert | A01K 1/0107 119/51.02 |
| 2013/0193524 A1 | 9/2013 | Taneja | |
| 2015/0053138 A1 * | 2/2015 | Ramsey | H04M 1/72533 119/61.5 |

FOREIGN PATENT DOCUMENTS

| | | |
|---|---|---|
| JP | 2013-021955 | 2/2013 |
| JP | U3194323 | 10/2014 |
| WO | 2014/013319 | 1/2014 |

OTHER PUBLICATIONS

PCT Search and Written Opinion PCT/IB2015/054702, dated Mar. 1, 2016.

* cited by examiner

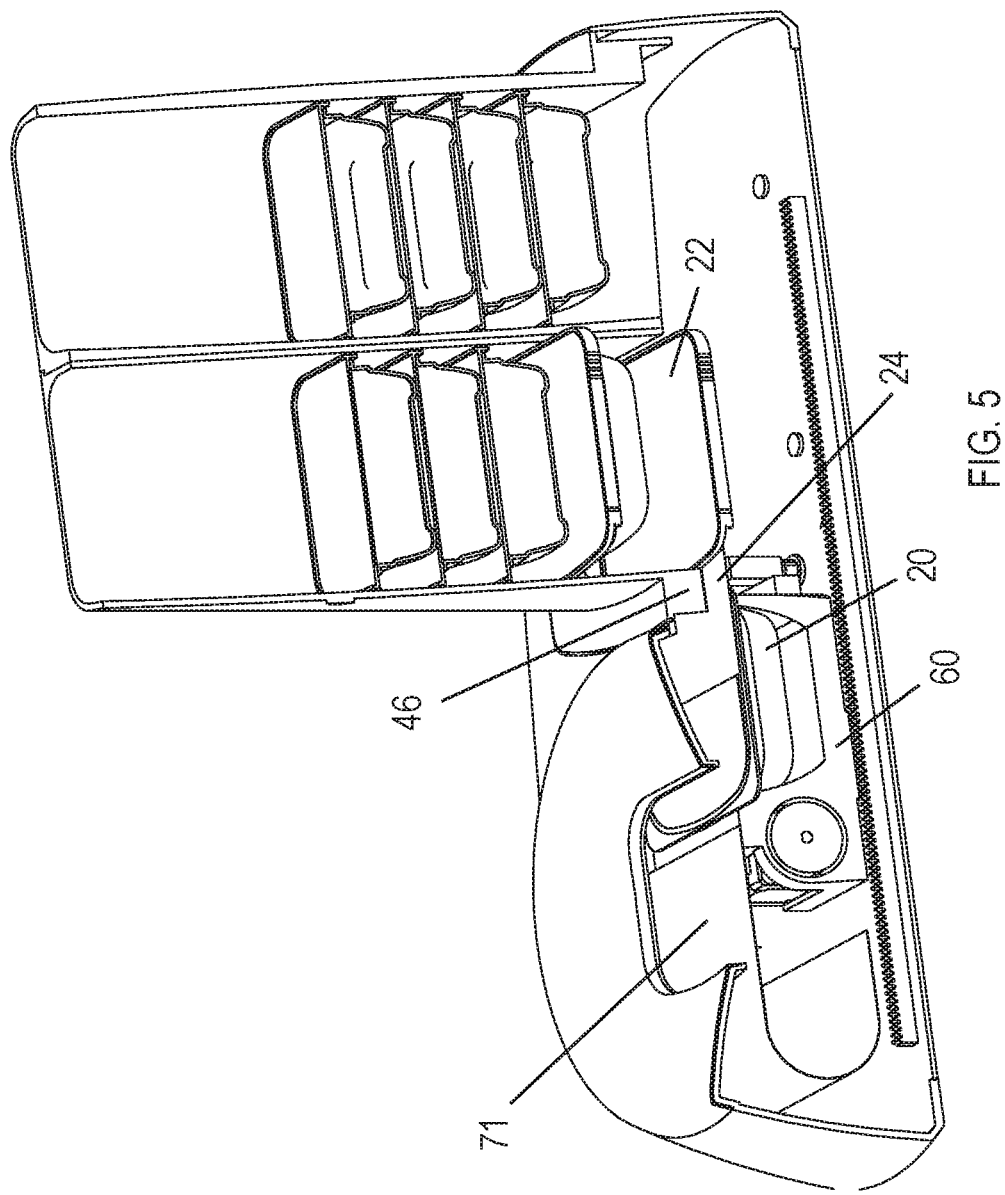

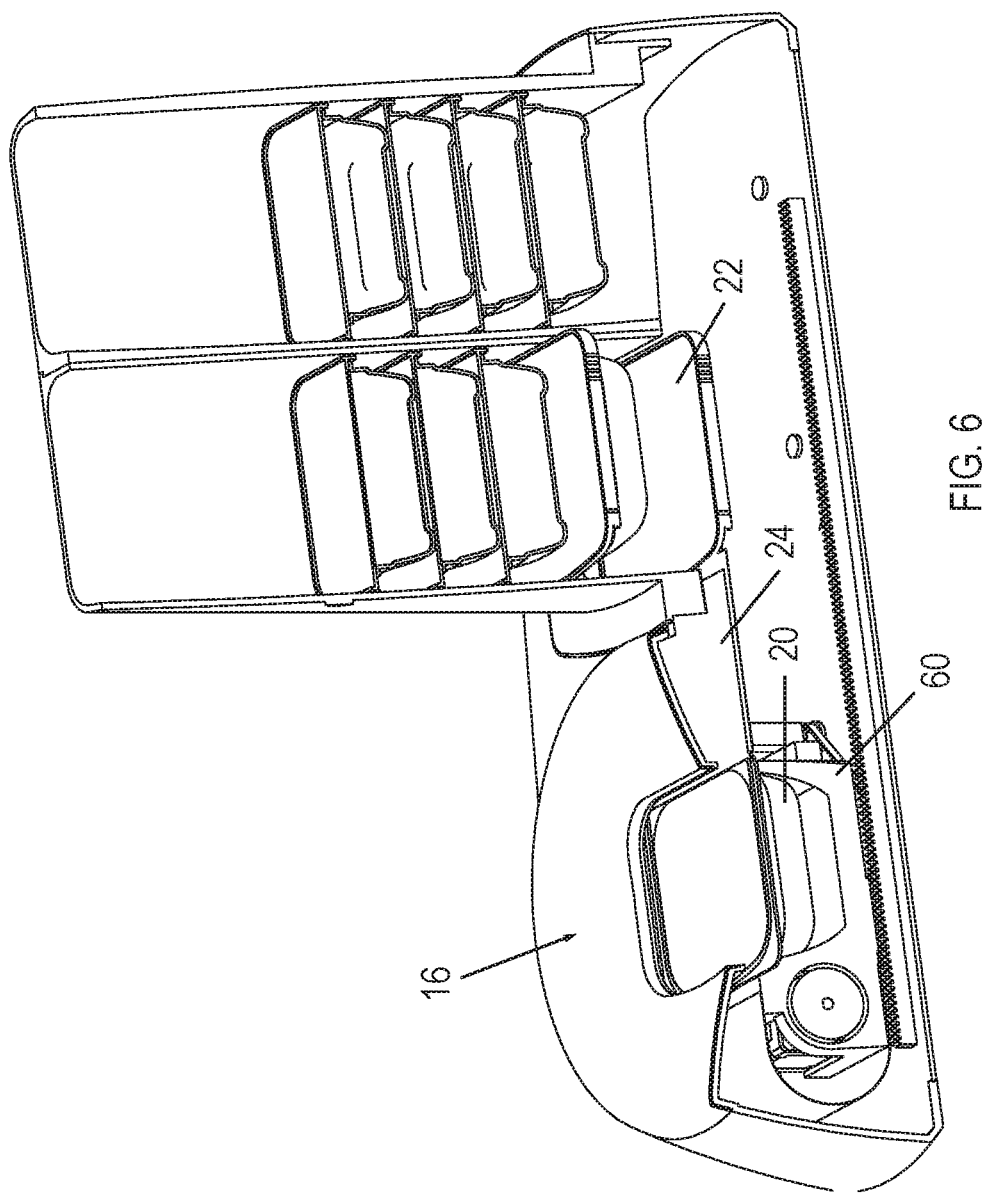

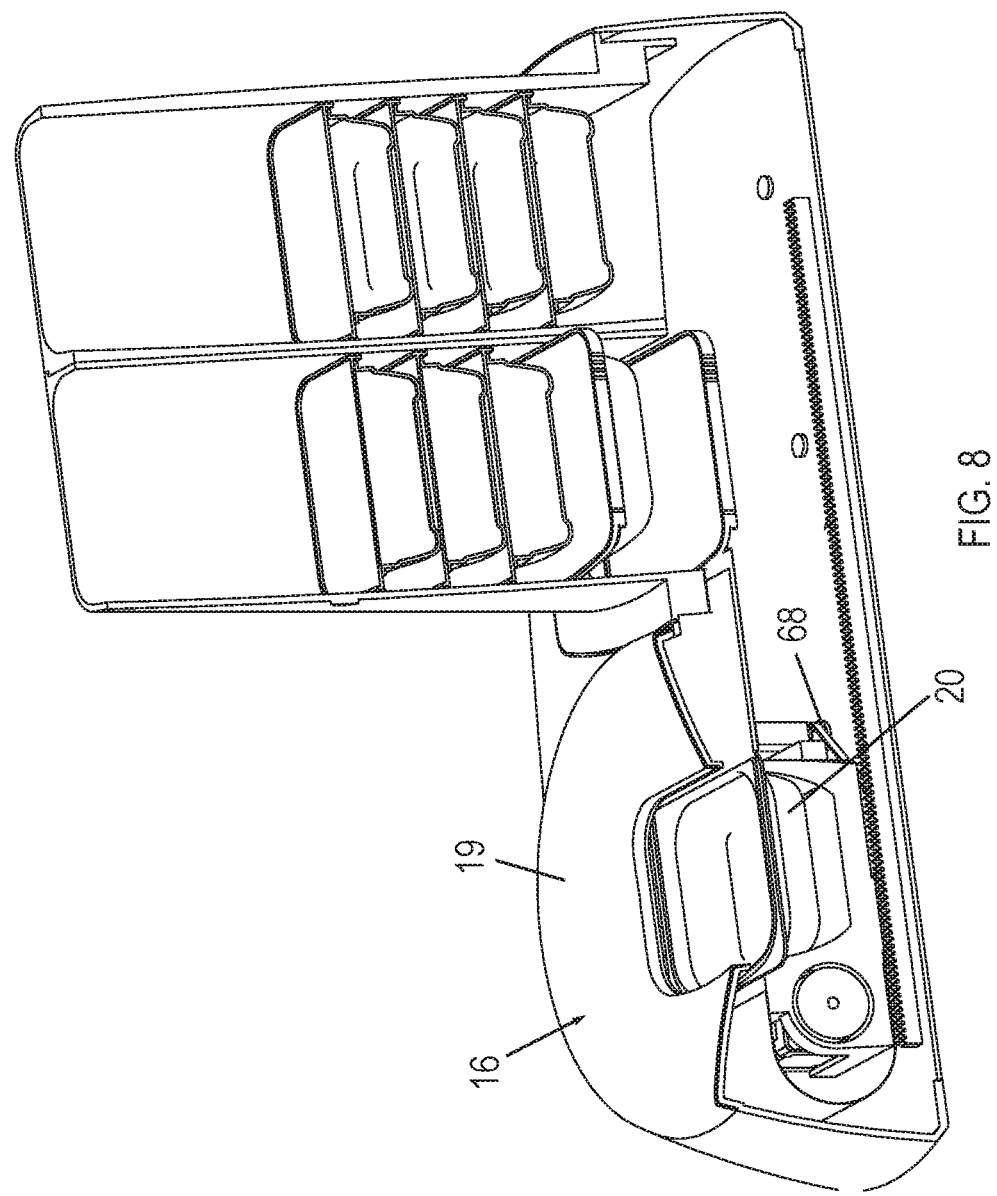

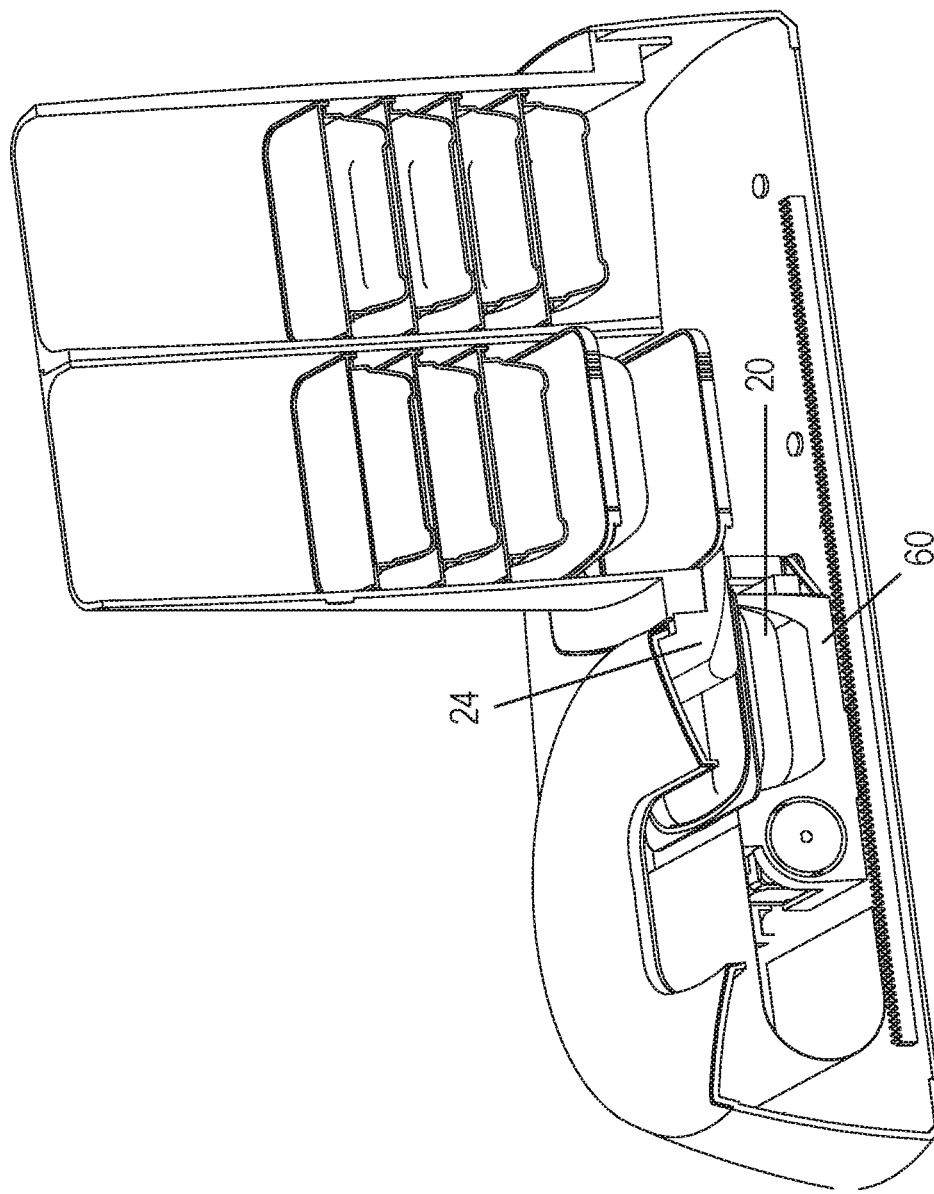

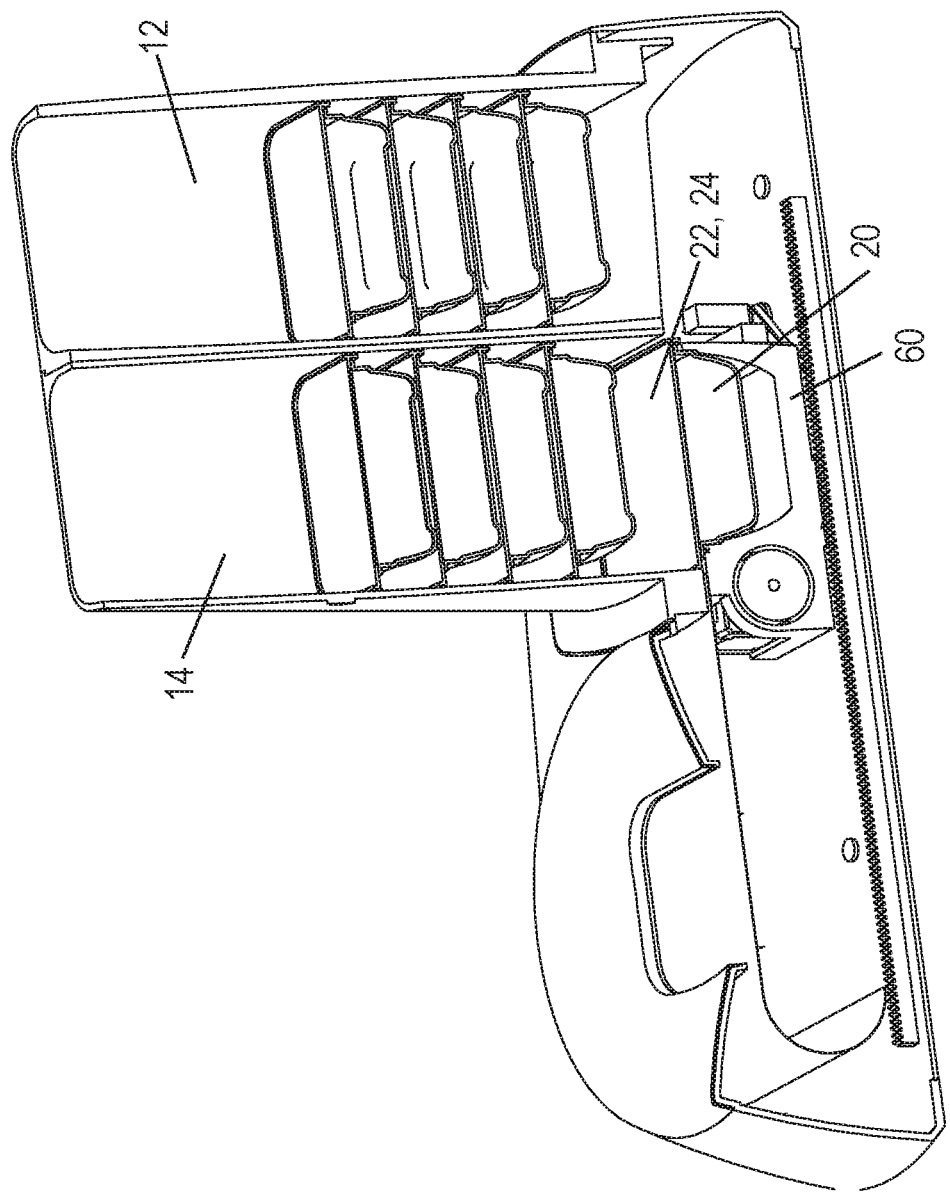

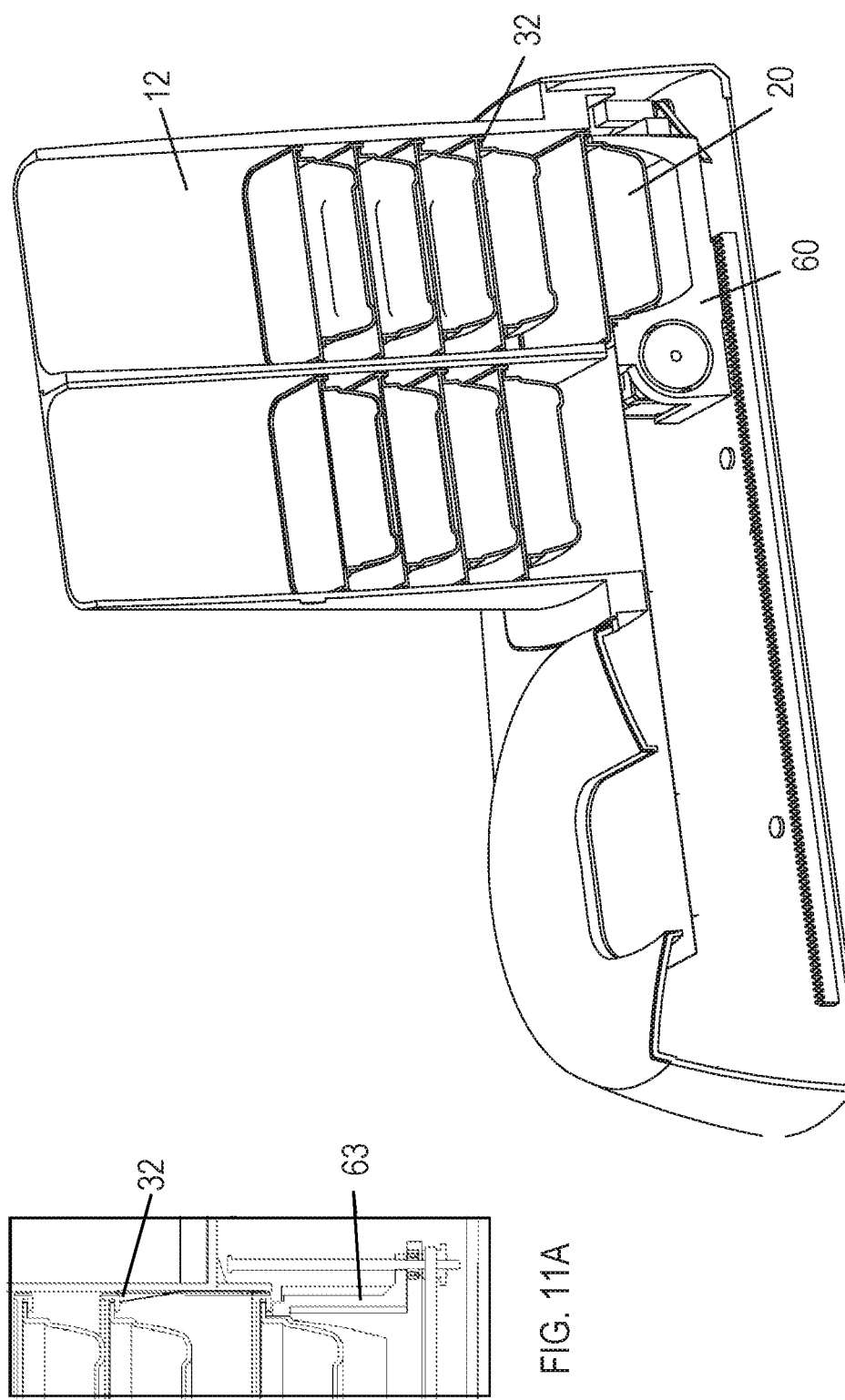

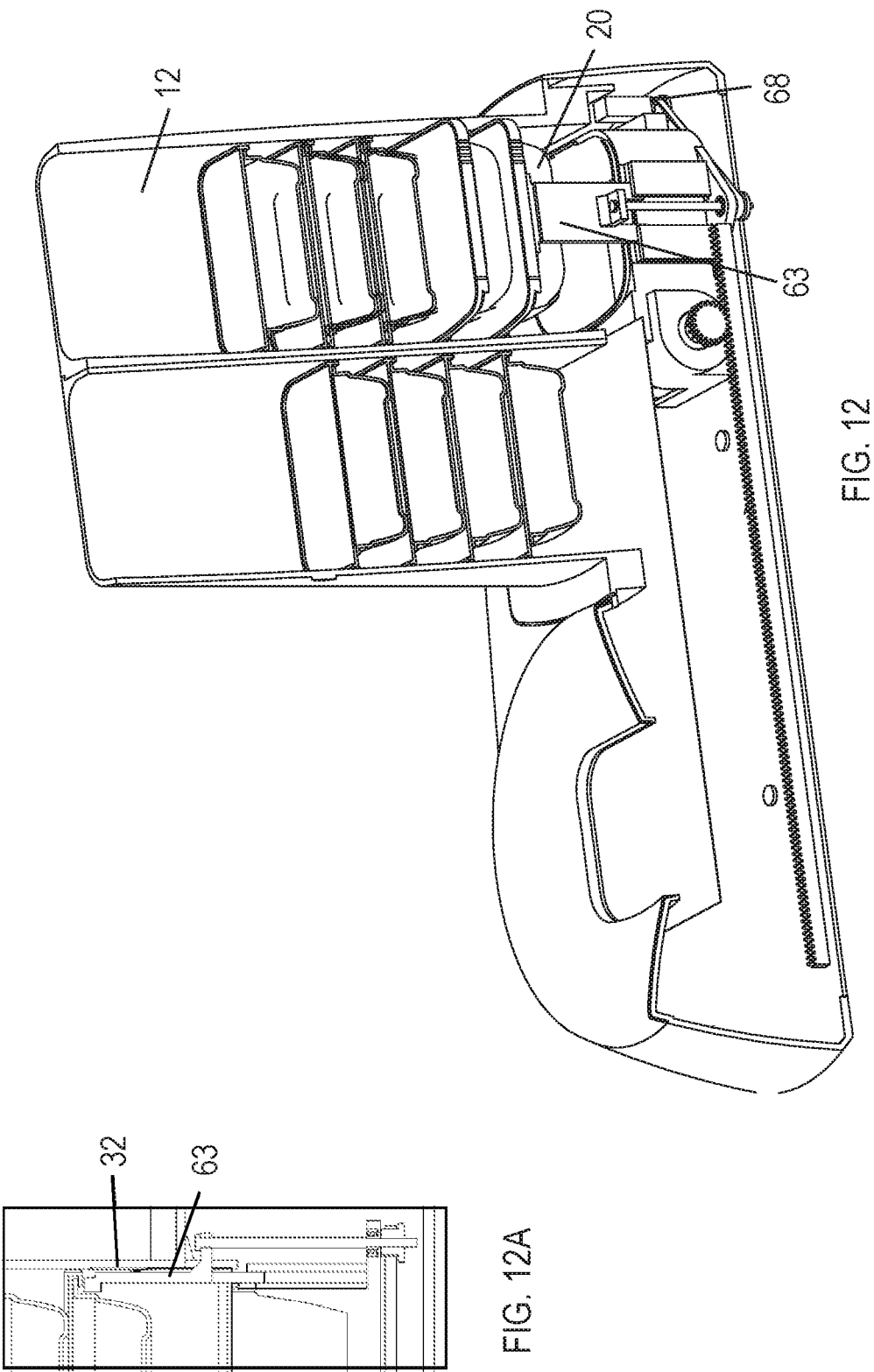

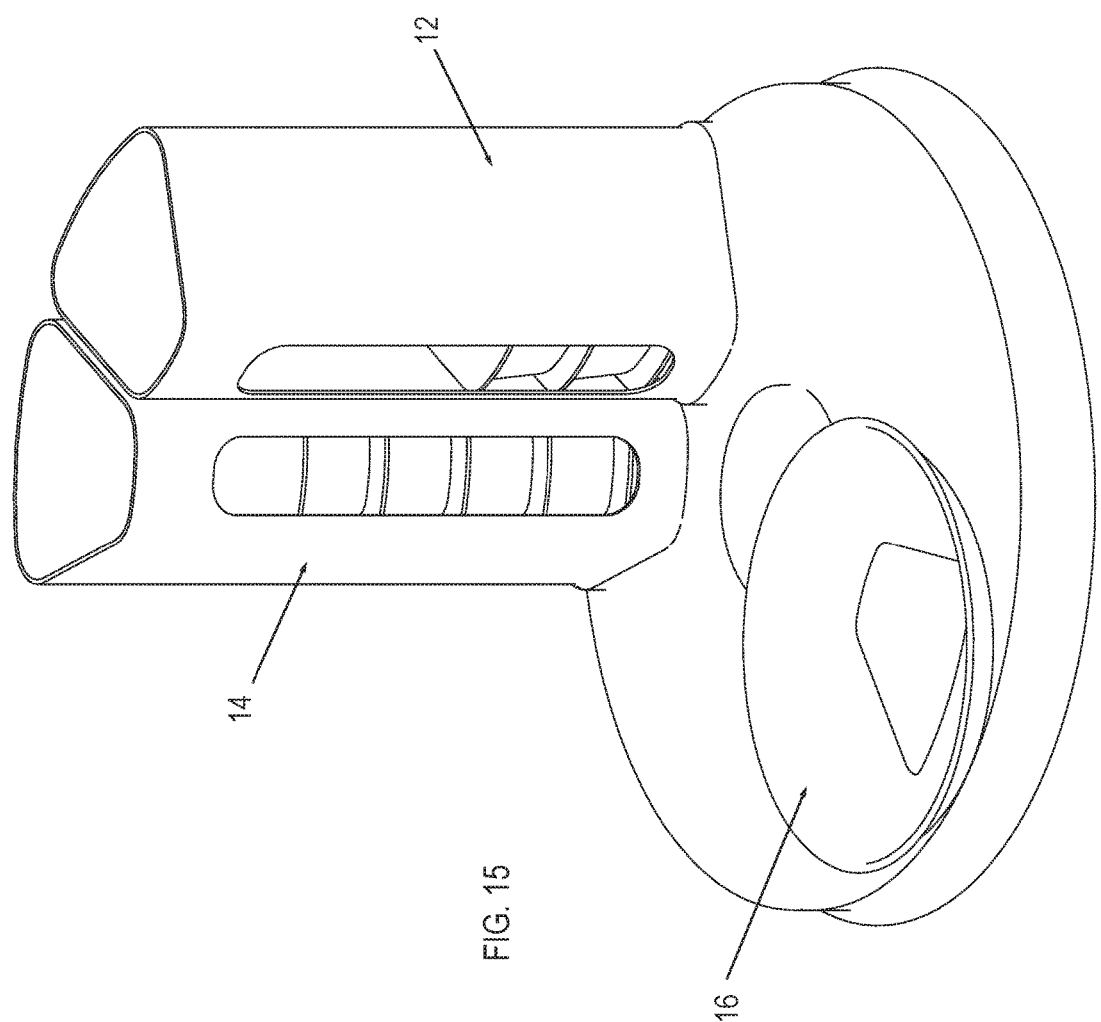

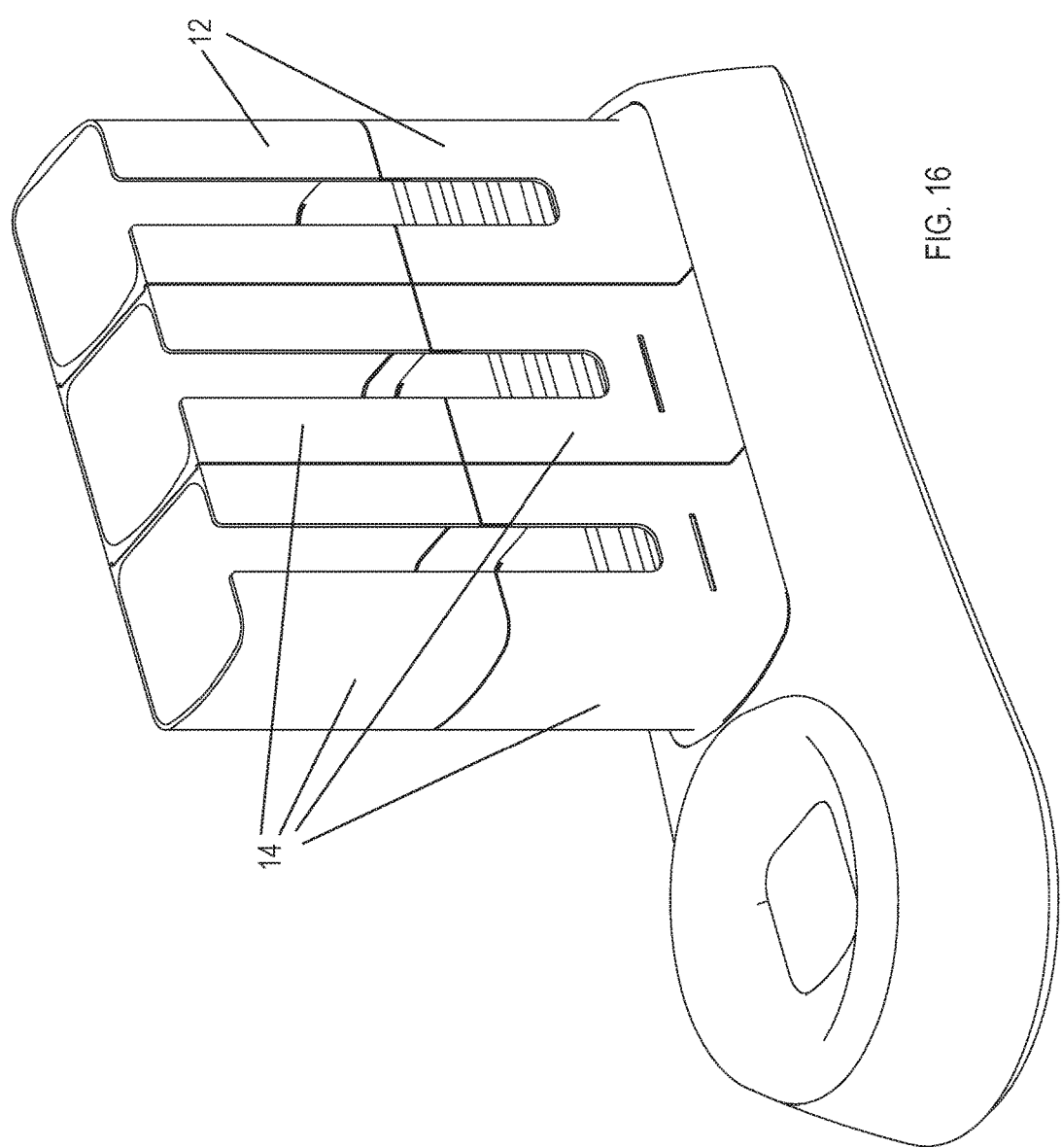

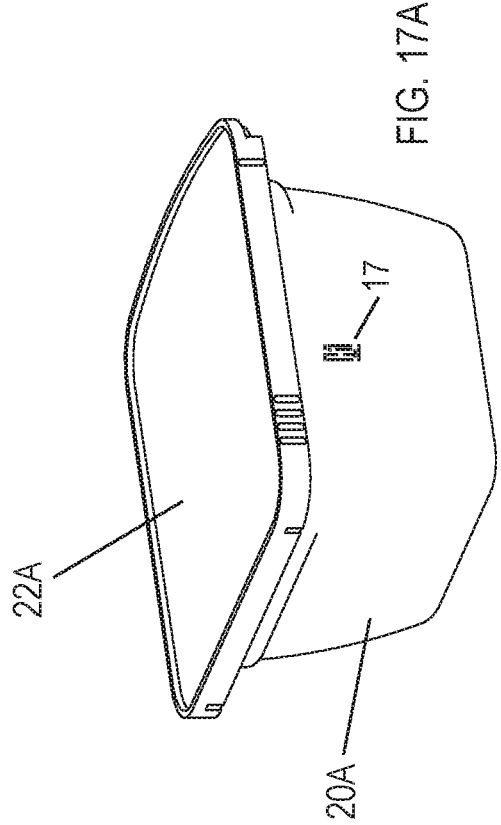

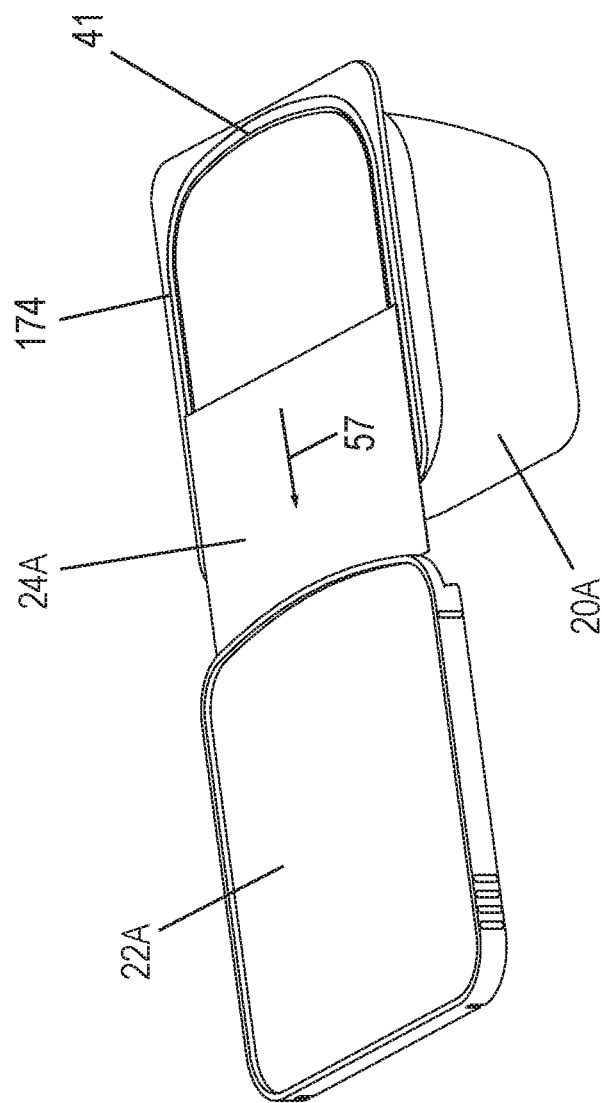

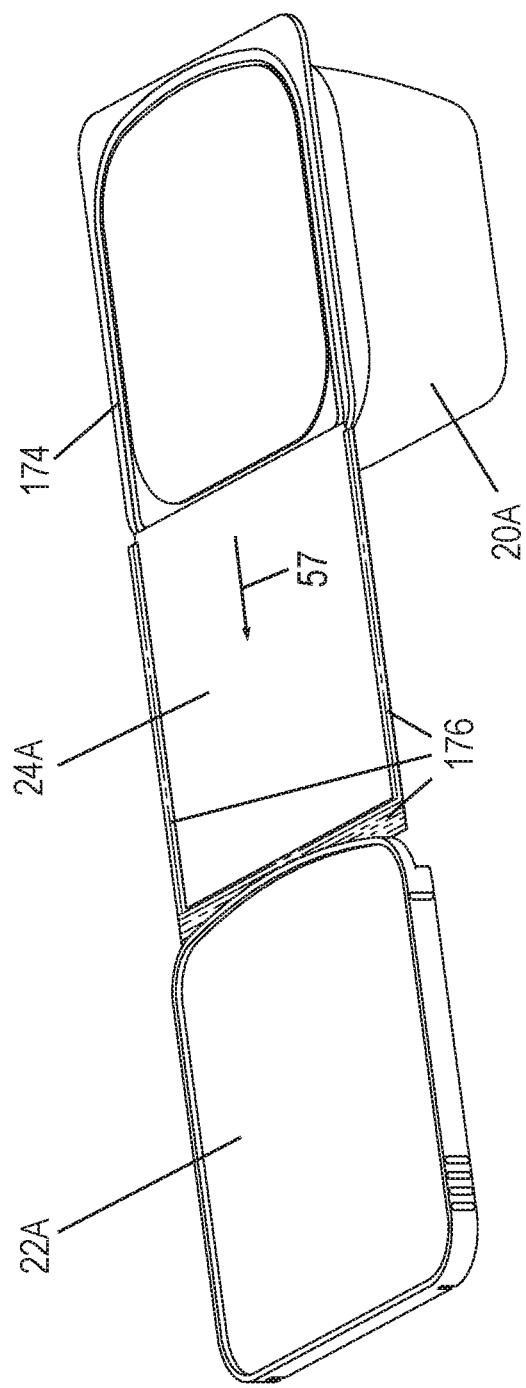

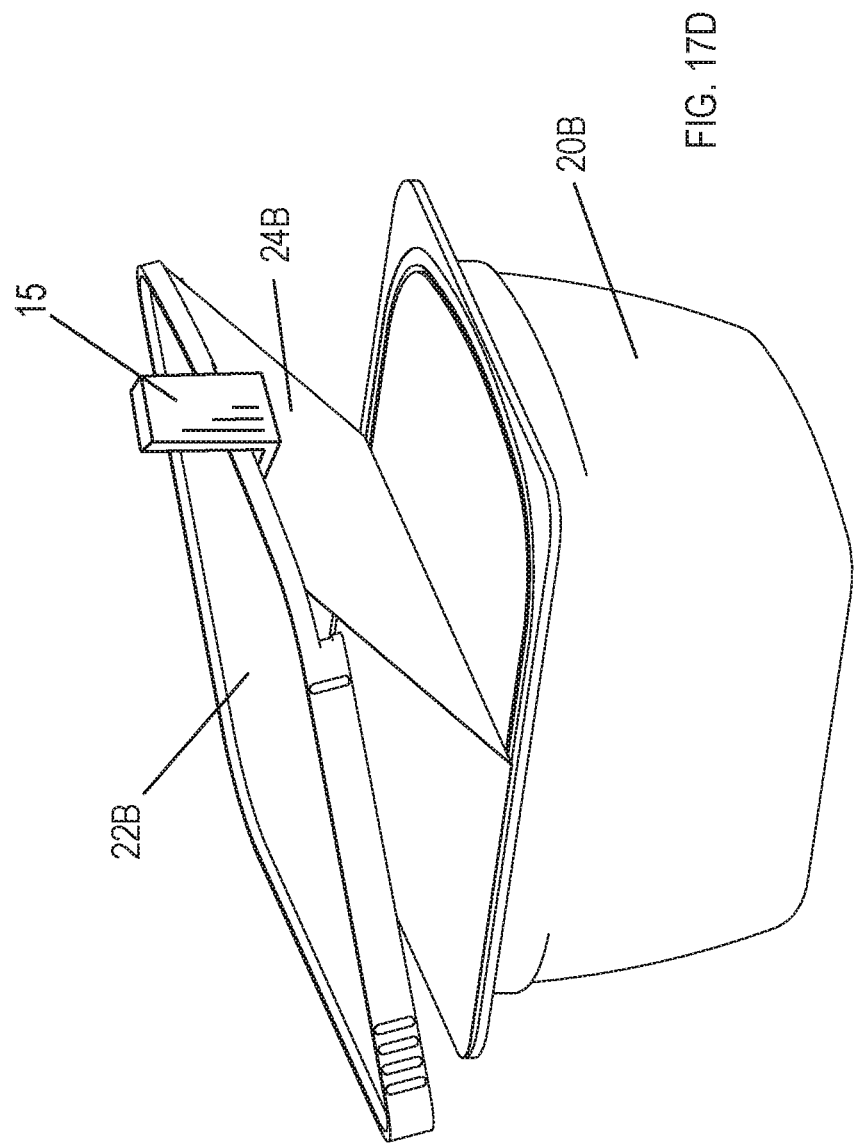

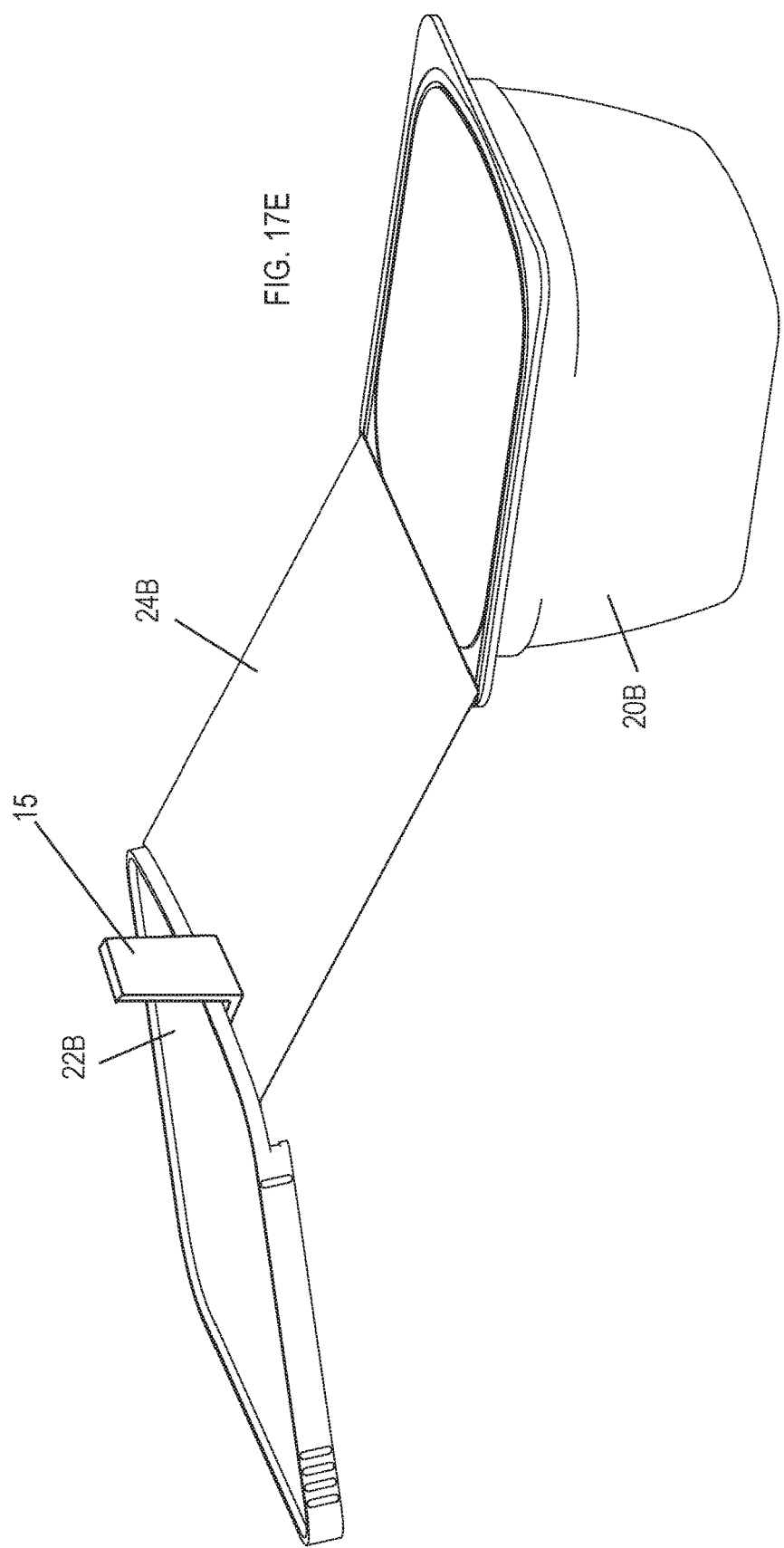

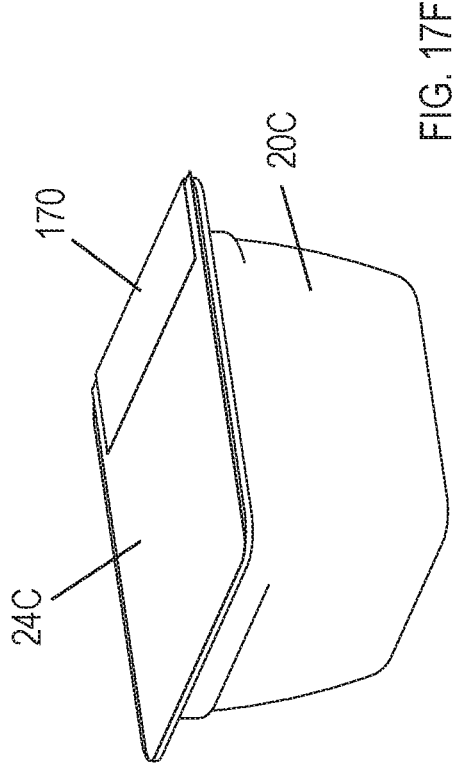

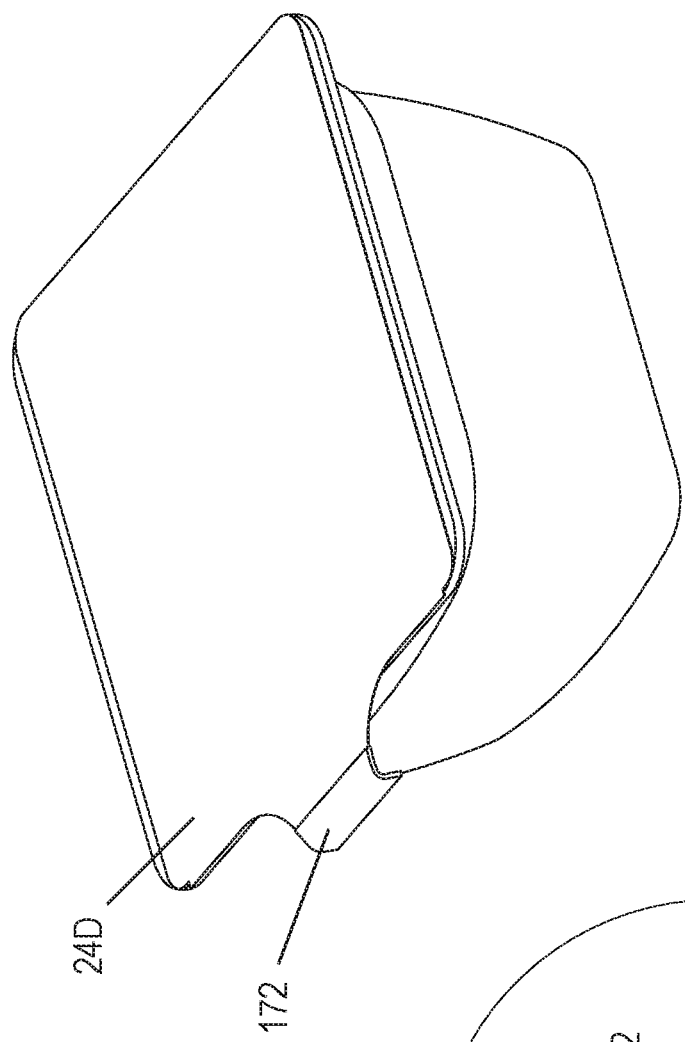
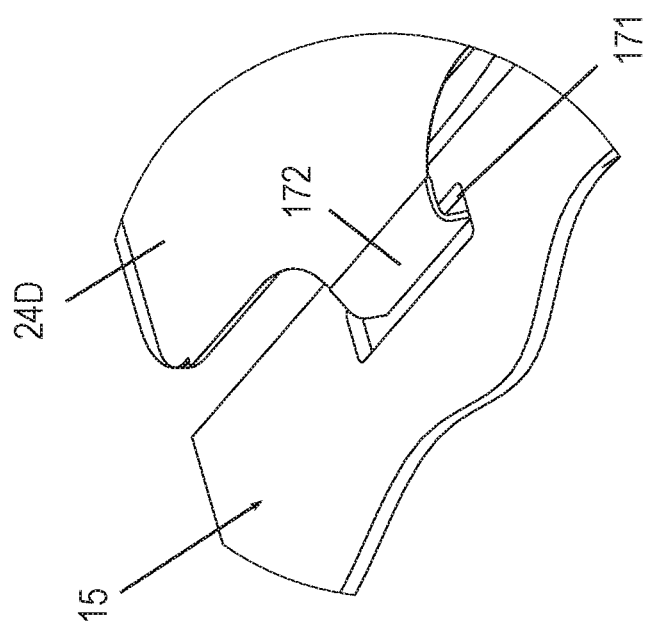

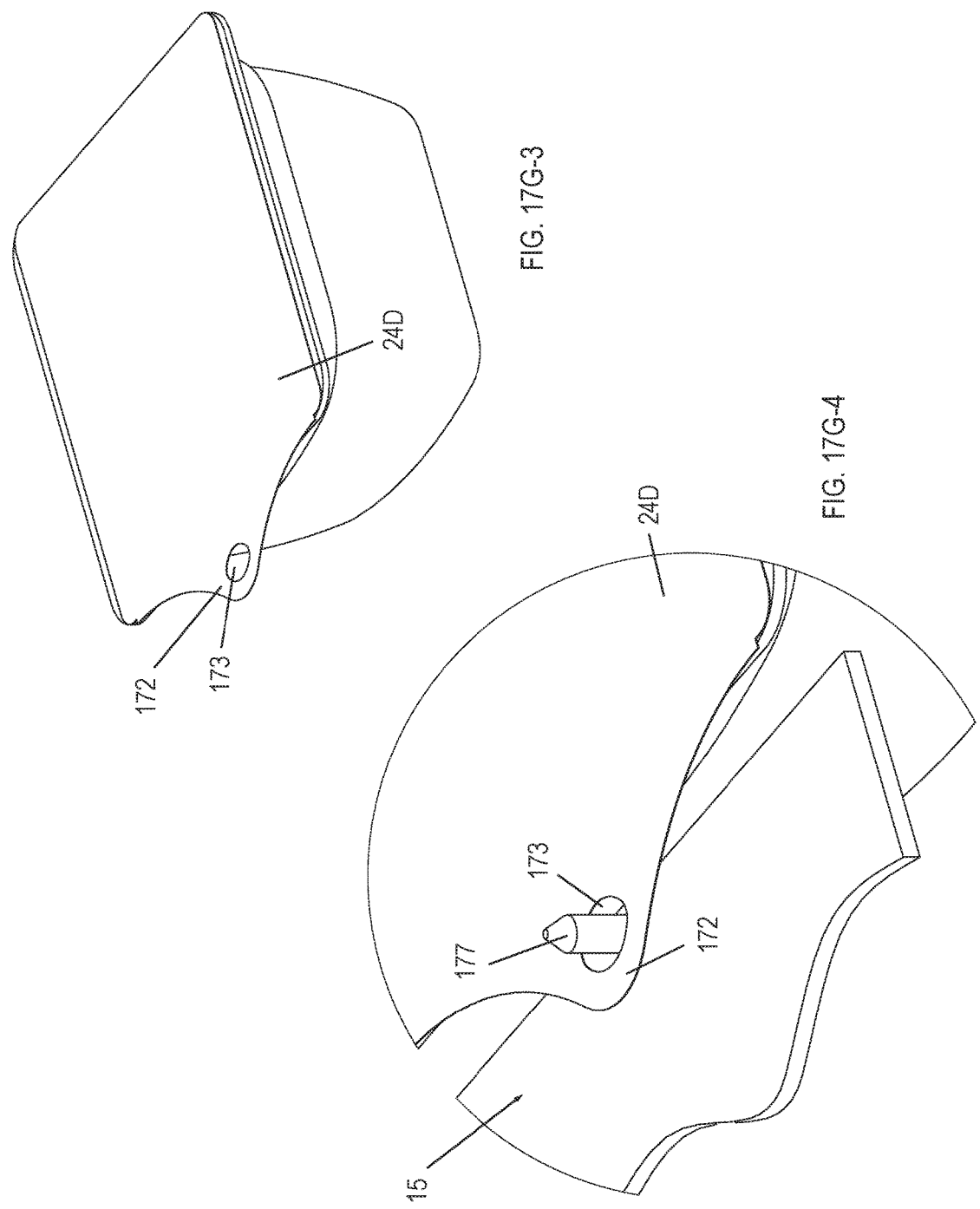

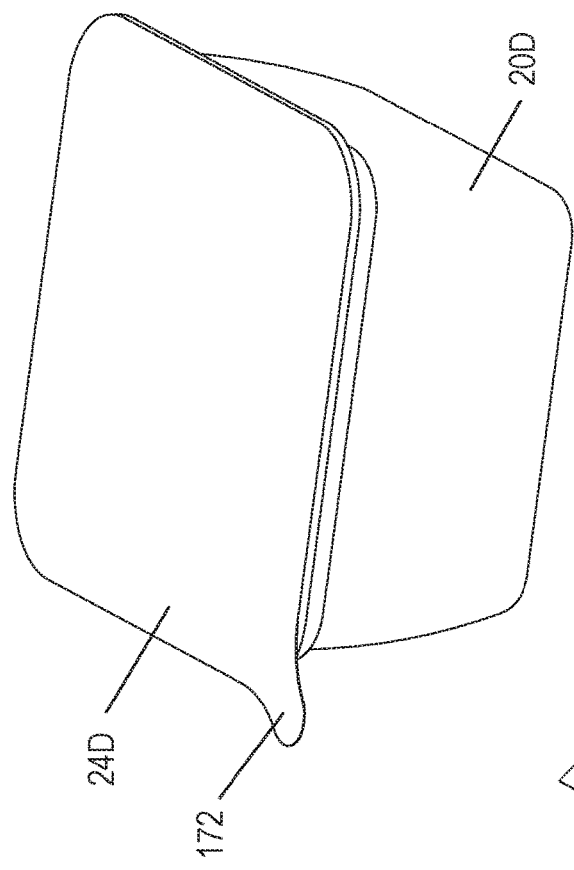
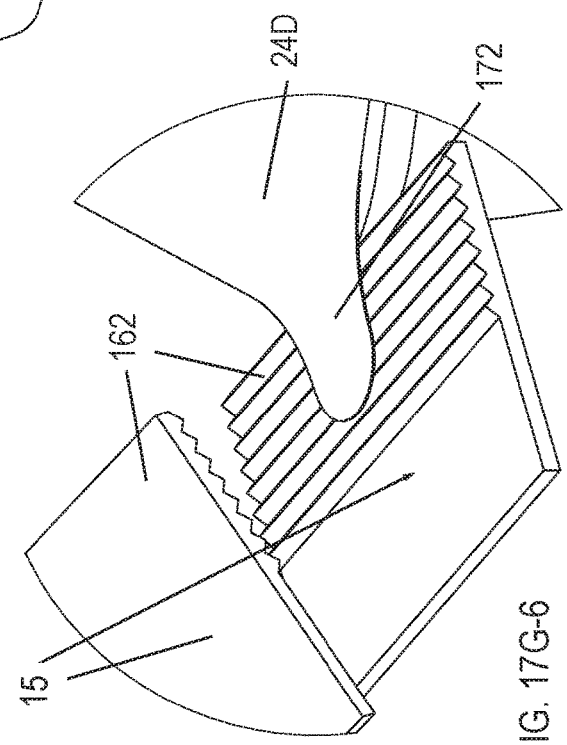

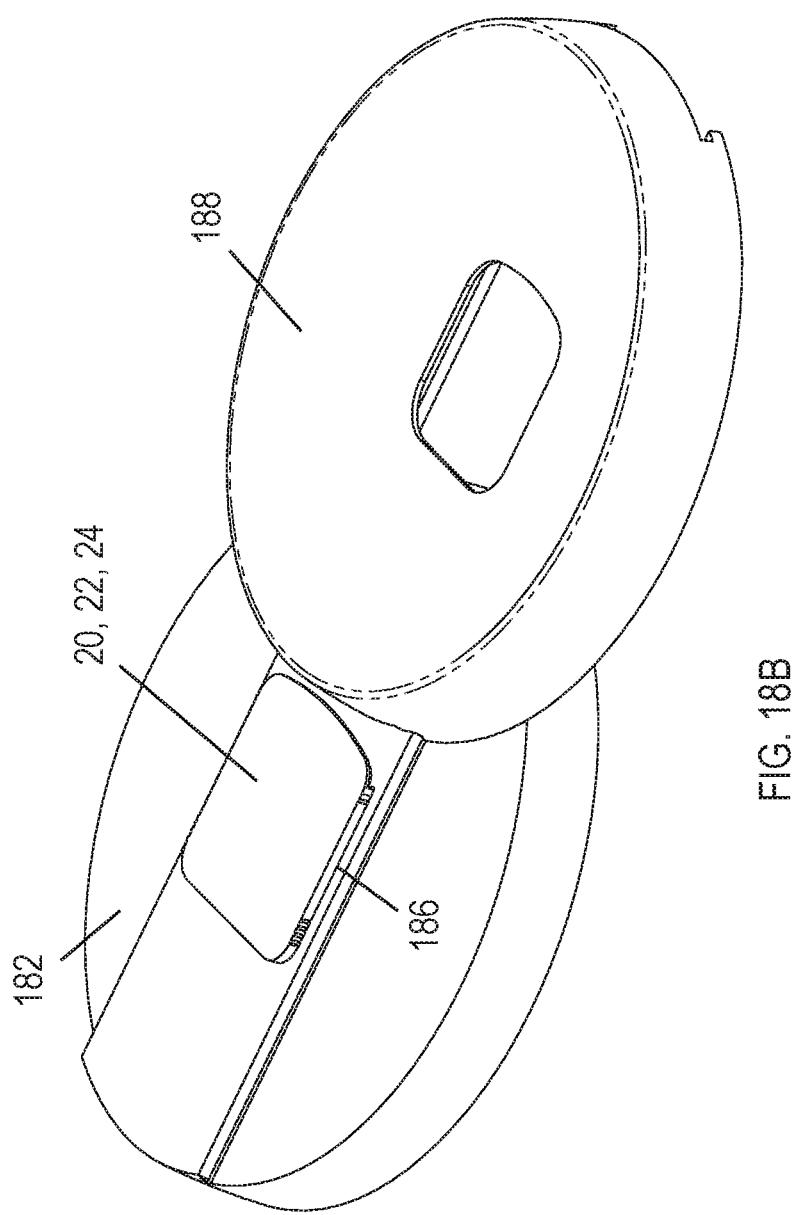

ANIMAL FEEDING SYSTEM

FIELD OF THE INVENTION

The present invention relates generally to feeding assemblies for animals, and particularly to an animal food container and animal feeding system for feeding an animal.

BACKGROUND OF THE INVENTION

Many kinds of animal feeding systems are known for supplying dry and moist (wet) food to animals, such as pets. Food comes in many kinds of containers (or capsules, the terms being used interchangeably throughout), both dry and moist food.

SUMMARY OF THE INVENTION

The present invention seeks to provide an improved animal food container and animal feeding system for feeding an animal, as is described more in detail hereinbelow.

BRIEF DESCRIPTION OF THE DRAWINGS

The present invention will be understood and appreciated more fully from the following detailed description taken in conjunction with the drawings in which:

FIG. 5 is a simplified partially cutaway, pictorial illustration of the animal feeding system, wherein the conveyor has moved forward together with a food container so as to peel a sealed closure element partially off the food container;

FIG. 6 is a simplified partially cutaway, pictorial illustration of the animal feeding system, wherein the conveyor has reached the feeding position and stopped and a sealed closure element is opened (e.g., peeled) so the food container is opened;

FIG. 8 is a simplified partially cutaway, pictorial illustration of the animal feeding system, after eating, wherein the elevator mechanism has been lowered;

FIG. 9 is a simplified partially cutaway, pictorial illustration of the animal feeding system, wherein the conveyor has moved partially backwards;

FIG. 10 is a simplified partially cutaway, pictorial illustration of the animal feeding system, wherein the conveyor with the consumed food container has moved back so that the closure element is closed back on the food canister to block any odors from exiting therefrom and any insects or pests from entering therein;

FIG. 11 is a simplified partially cutaway, pictorial illustration of the animal feeding system, wherein the conveyor and the consumed food container have moved under a waste station;

FIG. 11A is a simplified illustration of the position of the cart arms in FIG. 11; FIG. 12 is a simplified partially cutaway, pictorial illustration of the animal feeding system, wherein the elevator mechanism has elevated the consumed food container to be deposited in the waste station;

FIG. 12A is a simplified illustration of the supporting element now supporting the used food container in FIG. 12;

FIG. 15 is a simplified pictorial illustration of the waste station and food storage station arranged in a curved (e.g., circular) arrangement;

FIG. 16 is a simplified pictorial illustration of multiple food storage stations in the animal feeding system;

FIGS. 17A-17I are simplified pictorial illustrations of different kinds of food containers, in accordance with non-limiting embodiments of the invention;

FIGS. 18A-18D are simplified pictorial illustrations of a manually operated animal feeding system, constructed and operative in accordance with a non-limiting embodiment of the invention.

DETAILED DESCRIPTION OF EMBODIMENTS

Figure 1:
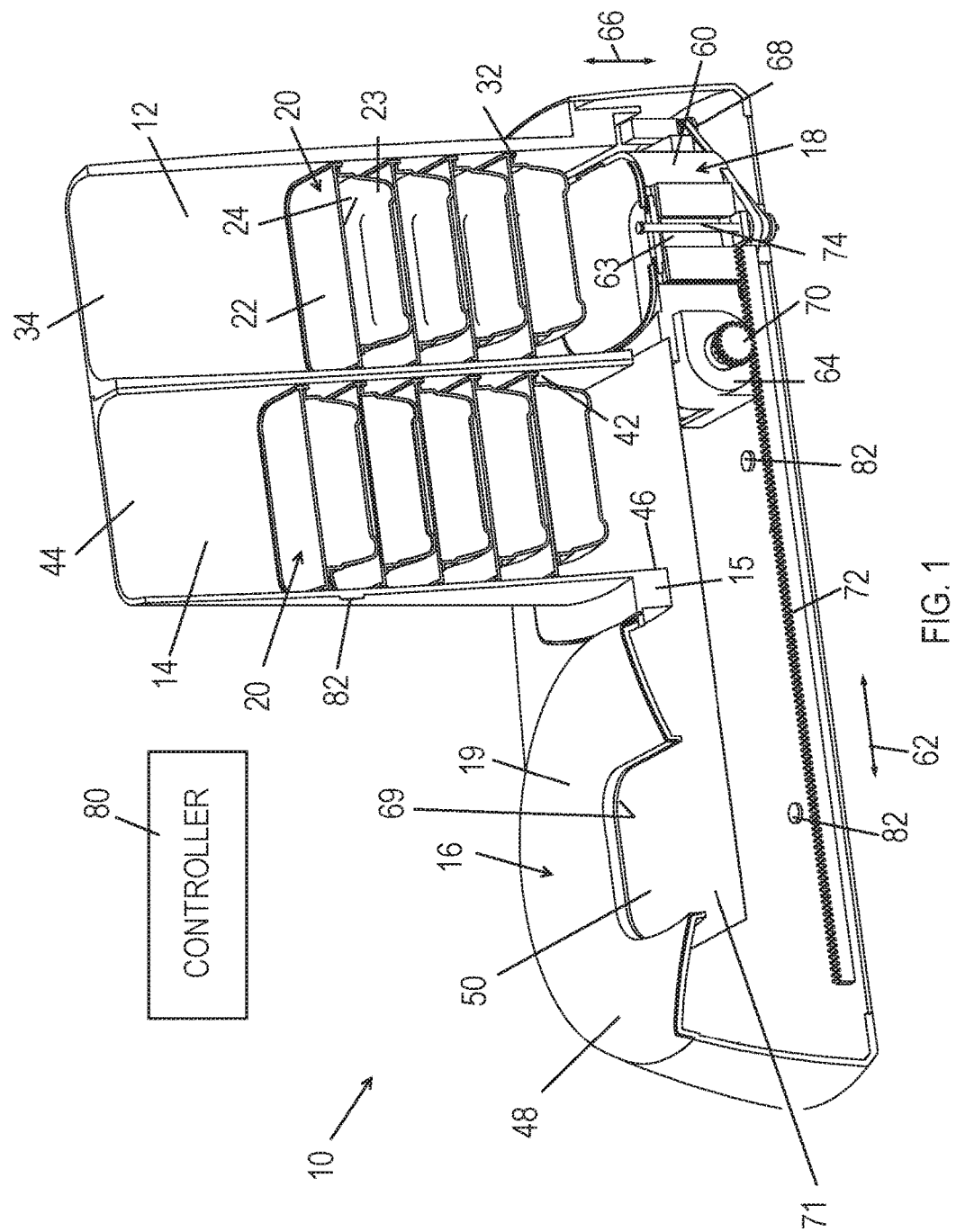
FIG. 1 is a simplified, partially cutaway, pictorial illustration of an animal feeding system, constructed and operative in accordance with a non-limiting embodiment of the invention, showing a conveyor for a food container in a stand-by position prior to receiving a food container.

Reference is now made to FIG. 1, which illustrates an animal feeding system 10, constructed and operative in accordance with a non-limiting embodiment of the invention.

The animal feeding system 10 includes a waste station 12, a food storage station 14, an opening mechanism 15 for opening food containers, a feeding station 16 and a conveyor 18 for conveying food containers 20 from one station to another, as will be described more in detail hereinbelow.

Food Container 20

The animal food container 20 contains any kind of animal food, dry or wet (wet and moist are used interchangeably). The animal food container 20 may be made of plastic (including multi-layers), metal or any other suitable material for packaging therein animal food. The animal food container 20 may be hermetically sealed, that is, sealed against ingress and egress of germs, bacteria, oxygen or other materials. The animal food container 20 may withstand sterilization (such as but not limited to, sterilization for a duration of 25 minutes at 140° C.), and withstand pressures associated with the sterilization process.

The animal food container 20 may include a removable cover 22 (e.g., made of plastic or aluminum) on a rimmed base 23. Alternatively, the food container 20 may include a seal, such as a foil cover 24 (impermeable, such as aluminum foil), plastic soldered on the capsule rim, without an additional cover. Alternatively, a combination may be used of a cover with a separate seal (e.g., foil) placed underneath the cover, such as is common in many food packages, such as dairy products, salads, etc. The term foil or foil seal encompasses any flexible material (such as but not limited to, thin plastic or metal membranes, foils, sheets and the like) capable of covering and sealing a container to a desired degree of sealing and which is capable of being peeled, torn or slid off the container.

As described below, animal food container 20 may be opened by opening mechanism 15 of feeder 10, which may lift/grab a holding feature in the container, such as a special tip/foil/cover, or any other feature. The container 20 may be re-sealed/closed after usage. For example, the foil cover may be adhered back into place on the rim (e.g., by adhesive). As another example, the cover may be put back into place and re-sealed or semi-sealed on the container. This re-sealing may help avoid bad odor (from food leftovers in the consumed container) and may help avoid entry of ants and other insects and pests into the consumed container.

Container 20 may contain different types of food, such as but not limited to, wet food (semi-soup, flakes, chunks, or any other food type on the market), moist food, dry food, and treats and may be of any flavors and varieties.

The feeder system can handle all kinds of containers, including different sizes and shapes of containers at the same time, such as but not limited to, single serve containers, small size containers, large size containers, multiple compartment containers, etc.

Container 20 may be a multi/dual food container (e.g., separate compartments for wet and dry food). Optionally, the different types of food may be mixed together before, during or after opening by means of a mixing and/or serving device in the feeder or included in the container.

Container 20 may be shallow with smooth rounded corners with no sharp edges, so as not to cause any harm to pets and provide easy access and feeding. Different kinds of food containers which may be used to carry out the invention are described further below.

Container 20 may have a readable code 17 (FIG. 17A) for recognizing the type of food/container (size, flavor, meat, vegetable, mixed variety, or any other defining feature) by the feeder, such as but not limited to, a bar code, QR code, codes with surrounding bars/rings, RFID, or a color coding for electro-optical color sensing (or any other type) or any proprietary code for distinguishing between different foods and/or containers, or an authentication code that the feeding system recognizes, wherein if the code is authorized the food container is permitted for use with the system and if the code is not authorized the food container is not permitted for use with the system.

Waste Station 12

The term "station" as used throughout the description and the claims, encompasses any suitable place for placing the food containers with or without a housing at least partially around the containers. In the illustrated embodiment, waste station 12 is an elongate housing (or any other alternative shape) for storing therein a stack (or any other arrangement, orderly or not) of used food containers 20. Waste station 12 includes one or more supporting elements 32, such as but not limited to, latches that protrude from inner sides of the waste station, that support the lowest one of the food containers 20. Alternatively, the sides of waste station 12 may be downwardly slanted so that the lowest food container is held by the reduced periphery of the slanted sides. The slanted sides are also referred to as supporting element 32. As will be described later, the conveyor 18 is capable of adding food containers 20 to the bottom of the stack by releasing/pushing the lowest food container 20 and replacing it with another spent food container 20, which becomes the newest lowest food container in the stack. (This is also the case for the slanted sides of waste station 12, wherein the upward force is sufficient to overcome the reduced periphery of the station and push the food container to the stack.)

Figure 14:
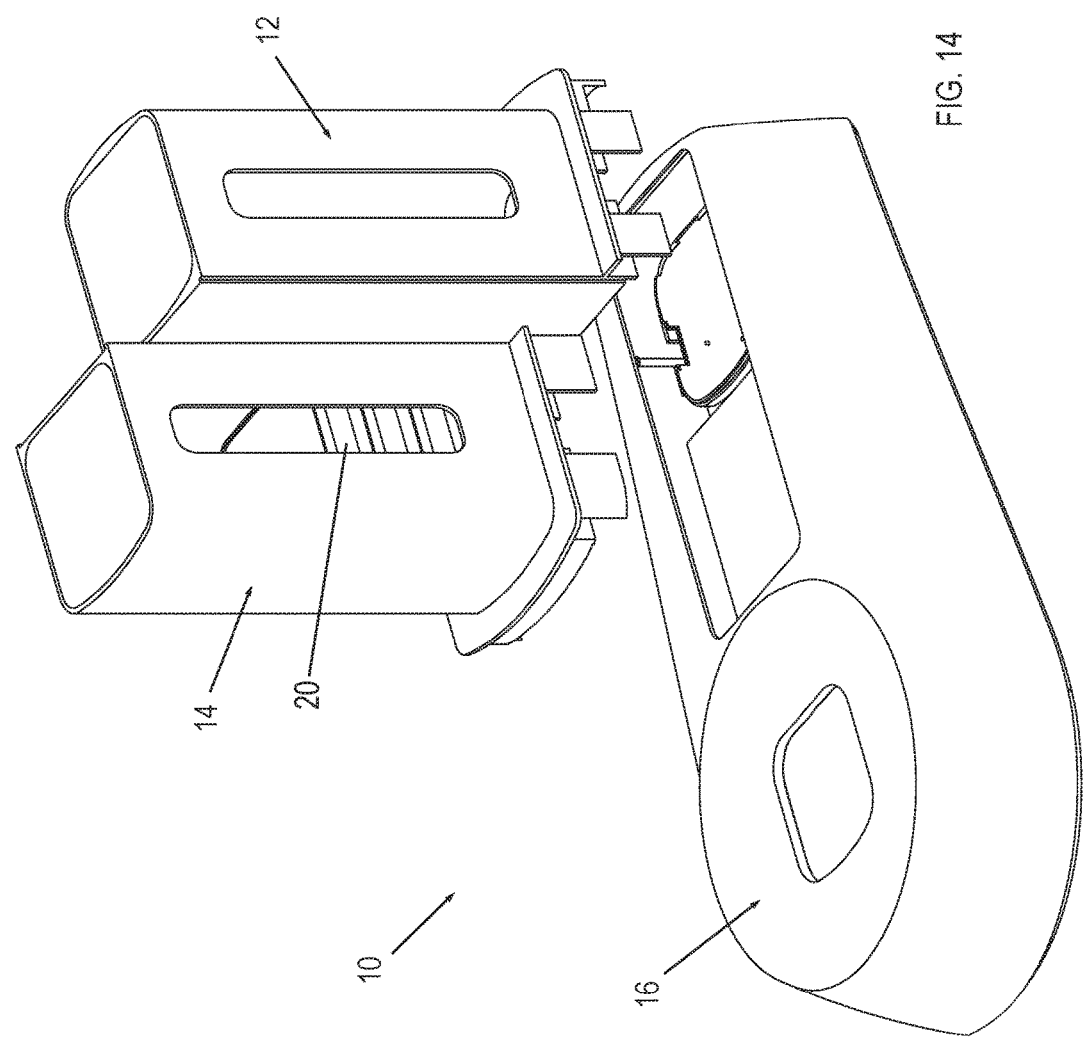
FIG. 14 is a simplified pictorial illustration of the waste station and food station detached from the animal feeding system.

The waste station 12 may be removable from animal feeding system 10, such as by means of detachable fasteners (such as click-on tabs that attach the waste station 12 to the animal feeding system 10), for easy disposal of the spent food containers. Alternatively, waste station 12 may be simply inserted in the system 10 and maintained in place by its own weight. FIG. 14 shows waste station 12 and food station 14 detached from system 10. Additionally or alternatively, waste station 12 may be provided with a door or access aperture (e.g., an elongate slot, as in FIGS. 14-16) to gain access and remove the spent food containers. Additionally or alternatively, waste station 12 may be provided with an exit port 34 for removing therethrough the spent food containers.

In the illustrated embodiment of FIG. 1, waste station 12 is in-line with food storage station 14. Alternatively, waste station 12 may be positioned at other places with respect to food storage station 14, such as in FIG. 15, wherein waste station 12 and food storage station 14 are arranged in a curved (e.g., circular) arrangement. In another option, the position of waste station 12 may be interchanged with the position of food storage station 14. Waste station 12 may optionally have a cover. Waste station 12 may optionally be sealed against egress of foul odors and the like, and against ingress of insects or other pests. Feeder 10 may optionally include multiple waste stations 12, as similarly shown for multiple food stations in FIG. 16. The waste station may alternatively be used for the food station and similarly the food station may alternatively be used for the waste station.

Food Storage Station 14

In the illustrated embodiment, food storage station 14 is an elongate housing (or any other alternative shape) for storing therein a stack (or any other arrangement, orderly or not) of food containers 20. Food storage station 14 includes one or more supporting elements 42, such as but not limited to, latches that protrude from inner sides of the food storage station, that support the lowest one of the food containers 20. Alternatively, the sides of food storage station 14 may be downwardly slanted so that the lowest food container is held by the reduced periphery of the slanted sides (but releasable, such as by being pulled through the reduced periphery by the conveyor/elevator mechanism). The slanted sides are also referred to as supporting element 42. As will be described later, the conveyor 18 is capable of releasing the lowest food container 20 from the stack for conveying that food container 20 to the opening mechanism 15 and feeding station 16.

The food storage station 14 may be filled with food containers 20 by simply placing the food containers one on top of the other through an entry port 44. Additionally or alternatively, food storage station 14 may be provided with a door or access aperture (e.g., an elongate slot, as in FIGS. 14-16) to gain access and replenish the station 14 with more food containers.

The food storage station 14 may be removable from animal feeding system 10, such as by means of detachable fasteners (such as click-on tabs that attach the food storage station 14 to the animal feeding system 10), for easy cleaning thereof or for easy insertion of the food containers. Alternatively, food storage station 14 may be simply inserted in the system 10 and maintained in place by its own weight. Food storage station 14 may optionally have a cover.

In the illustrated embodiment, food storage station 14 is in-line with waste station 12. Alternatively, food storage station 14 may be positioned at other places with respect to waste station 12, as seen in FIG. 15.

The food storage station 14 may be filled with the same or different kinds of food. Additionally or alternatively, more than one food storage station 14 may be provided with the same or different kinds of food, as seen in FIG. 16, which has multiple food storage stations 14. For example, in FIG. 16, one station may be used for wet food and another station for dry food. Additionally or alternatively, food station 14 may be modular, that is, additional modules of food containers may be added to the stack of food containers to increase the capacity and variety of food available to the animal. The controller may be used for controlling which kind of food is presented to the animal from the appropriate food station and at which times, in accordance with a feeding plan.

Opening Mechanism 15

In the illustrated embodiment, opening mechanism 15 includes a stopper 46 that abuts against a leading edge of the removable cover 22. As conveyor 18 moves the food container 20 past the opening mechanism 15, the cover 22 cannot move past stopper 46, which causes the cover 22 and/or seal 24 to be peeled off (or otherwise removed from, such as by tearing) the top of food container 20.

Alternatively, opening mechanism 15 may include a grasping element (such as pincers) that grasp an edge or other portion of the cover and/or seal and peel, lift or otherwise remove the cover and/or seal.

Alternatively, opening mechanism 15 may include a cutting mechanism that cuts a portion of the cover 22 and/or seal 24 that remains as a type of flap on the container for eventual re-closing.

Opening mechanism 15 may be part of food station 14 and/or any other part of feeding system 10. In an embodiment of the invention, the opening mechanism 15 opens the food container 20 as the container 20 moves past the opening mechanism 15, thereby making the contents of the food container 20 available for eating by the animal. Opening mechanism 15 opens the food container 20 so that the food container 20 may be re-closable/re-sealable after the animal has eaten, so that the container 20 may be conveyed for storage in waste station 12 without odors emanating therefrom and without insects or other pests from entering therein. Opening mechanism 15 can be used to open standard off-the-shelf food containers or proprietary food containers designed for unique use with the feeding system 10.

In one embodiment of the invention, opening mechanism 15 is also a closing mechanism, wherein movement of the food container back past the opening mechanism causes the food container to be re-closed/re-sealed. Alternatively, a separate closing mechanism (such as but not limited to, a cam, lug, etc.) may be provided to re-close/re-seal the used food container.

Feeding Station 16

In the illustrated embodiment, feeding station 16 includes an upper bowl portion 19 with an opening 50 dimensioned so that when the food container 20 is lifted and abutted against the underside of the opening 50, the food container is sealed against the opening 50, as is described below. Opening 50 is a through hole, that is, not a blind hole. The food container 20 and the upper bowl portion 19 together form the completed feeding bowl 16. The bowl portion 19 is provided with a slanted upper surface 48 to help food flicked by the animal to slide or flow back into the food container. The bowl portion 19 may be removed for cleaning and washing thereof. The bowl portion 19 may be made of plastic or metal (e.g., stainless steel).

An elastomer (e.g., rubber, silicone rubber, neoprene, etc.) seal 69 around the bottom rim of the opening 50 of bowl portion 19 ensures sealing between food container 20 and bowl portion 19 once container 20 is attached to (e.g., pressed against) bowl portion 19.

Conveyor 18

Conveyor 18 is any suitable means for conveying (moving) an article from one place to another. In the illustrated embodiment, conveyor 18 includes a cart 60 that moves along a first axis 62 (in either direction) by means of a first actuator 64, and optionally along a second axis 66 (in either direction) by means of a second actuator 68. In the illustrated embodiment, first actuator 64 is a motor with a pinion gear 70 that meshes with a gear rack 72, and the first axis 62 is the horizontal axis. In the illustrated embodiment, second actuator 68 is a motor that turns one or more threaded shafts or worm shafts 74 on which are moving mounted one or more cart arms 63. Cart arms 63 move along second axis 66 (e.g., up and down, this being the vertical axis). In the illustrated embodiment, there are two parallel shafts 74 which are operatively connected to second actuator 68 by means of a belt (or other mechanism, such as a gear train). Other actuators may be used for the first and second actuators 64 and 68, such as but not limited to, a pneumatic or hydraulic linear actuator, step motor, gear motor, electric/electronic linear actuator and others. As will be described below, cart arms 63 are used to release the supporting elements 42 that support the lowest food container 20 in the stack of containers in food storage station 14, and the cart arms 63 then lower the food container 20 into cart 60. Cart arms 63 also raise an empty container into the stack of empty food containers in waste station 12, by similarly releasing the supporting elements 32 and lifting the used container into the stack of containers in waste station 12 so that the container is supported by supporting elements 32.

Controller 80

The animal feeding system 10 includes a controller (processor) 80 (FIG. 1) for controlling all modes of operation of the system. Controller 80 may operate, without limitation, by means of wireless communication (Wi-Fi, Bluetooth, NFS, cellular, internet connectivity), or wire communication connection (e.g., USB). The controller 80 may cooperate with different sensors 82, such as but not limited to, position sensors that sense the position of the cart 60 (e.g., reed switches, contact switches, infrared or optical sensors, or induction or capacitance sensors, etc.); sensors that sense the level of food in the food container; sensors that sense the presence or absence of an animal eating; sensors in the waste station 12 and food storage station 14 that sense how many food containers 20 are stored there (e.g., infrared or optical sensors, load cells, etc.); and/or sensors at the feeding station 16 that sense the animal eating, including frequency of eating, speed of eating and other factors (e.g., infrared or optical sensors, cameras, webcams, etc.). The controller 80 may be used to activate, modify and stop the operating cycle. The controller 80 may also control operation of an Internet-based system or app for a mobile device that is used to monitor how many food containers have been used, to monitor animal feeding behavior, to buy additional food containers over the Internet, to communicate with the animal and many more.

Typical Operating Cycle

The operating cycle may be initiated by a manual action (e.g., a switch), semi-automatic operation (e.g., sensor senses animal) or fully automatic (e.g., a pre-programmed feeding plan), and may be operated locally (e.g., switch on the device), wirelessly (e.g., cell phone, laptop, Internet, etc.) or any other suitable means.

In FIG. 1, the cart 60 is in the stand-by position underneath the waste station 12. Cart 60 is empty at this point.

Figure 2A:
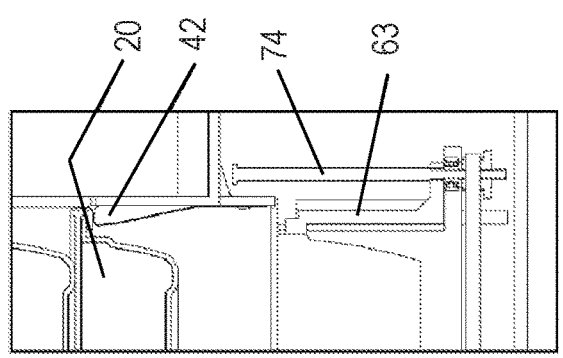
FIG. 2A is a simplified illustration of one of the supporting elements (e.g., latch) that supports the lowest food container in FIG. 2.
Figure 2:
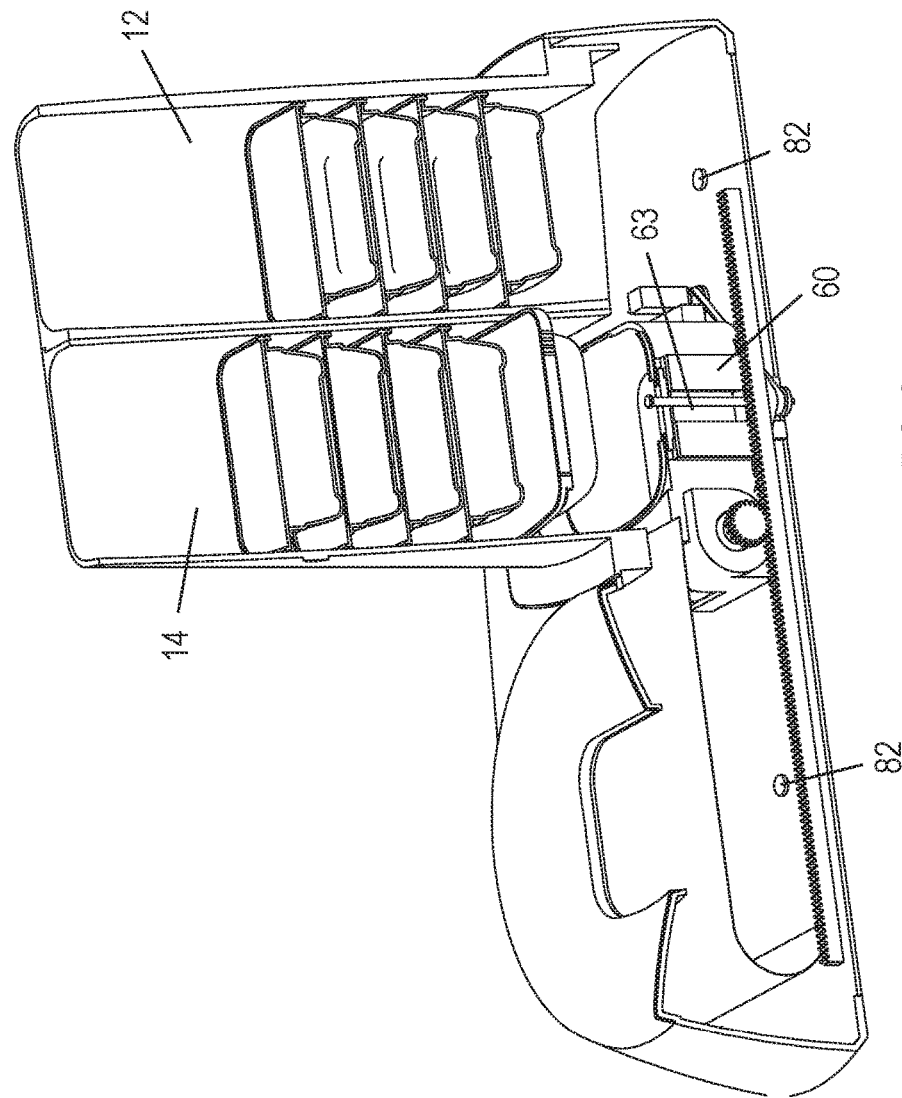
FIG. 2 is a simplified partially cutaway, pictorial illustration of the animal feeding system, wherein the conveyor has moved to a food storage station that includes a stack of food containers.

In FIG. 2, after feeding has been activated (e.g., via a switch or the controller), cart 60 moves and stops under food storage station 14 [by a position sensor, or a precise step motor position]. FIG. 2A clearly shows one of the supporting elements 42, in this case a pivoting or spring-loaded latch, which protrudes from the inner sides of the food storage station 14 and supports the lowest food container 20. Cart arms 63 are not yet lifted up.

Figure 3A:
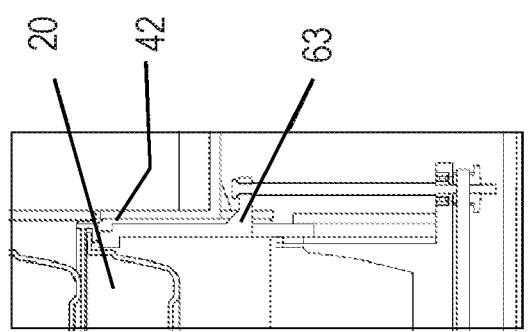
FIG. 3A is a simplified illustration of one of the cart arms having pushed in the latch in FIG. 3.
Figure 3:
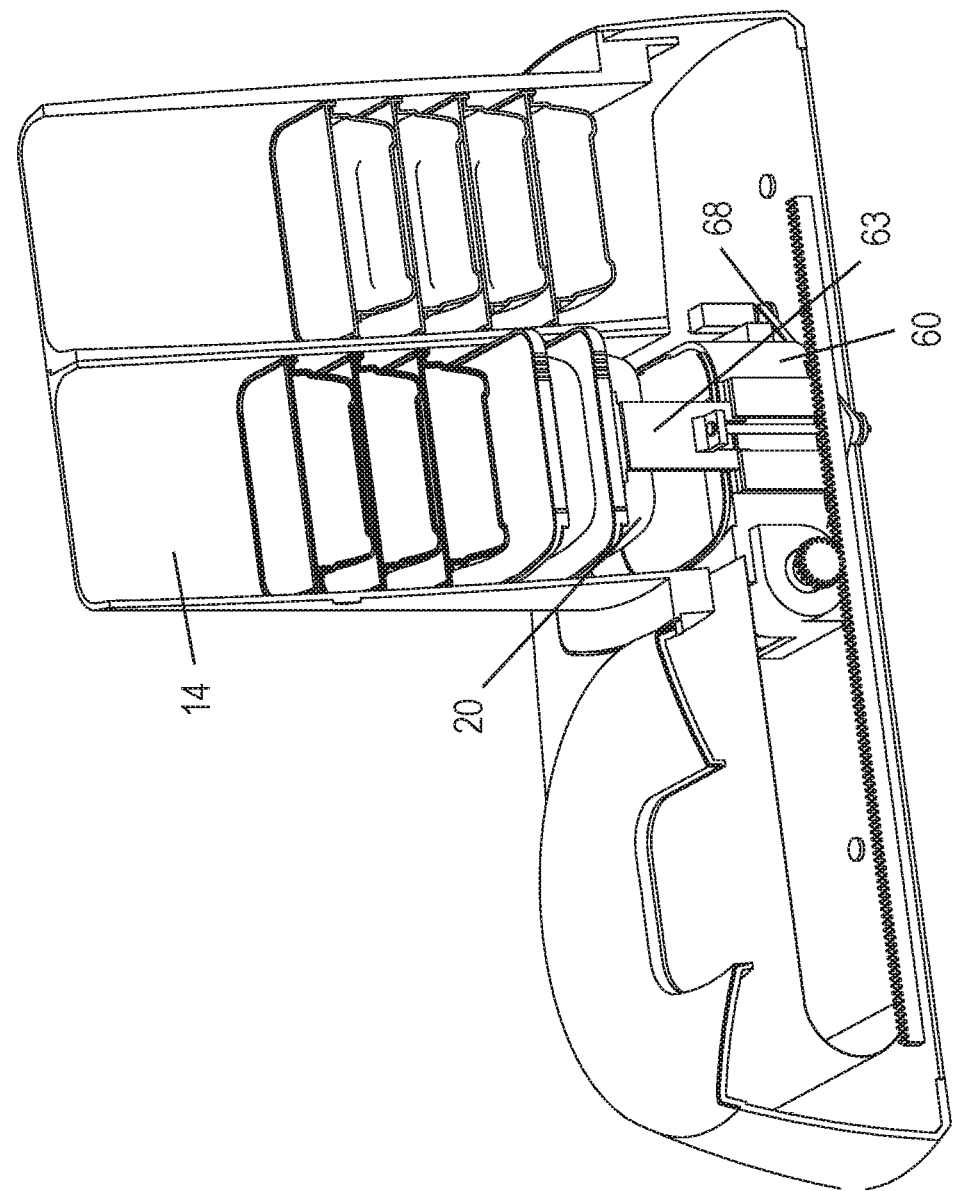
FIG. 3 is a simplified partially cutaway, pictorial illustration of the animal feeding system, wherein an elevator mechanism of the conveyor has been raised to release the bottom-most food container.

In FIG. 3, the second actuator 68 has raised one or more arms 63 from cart 60. This releases the bottom food container 20, such as by opening the latches 42 on the sides of station 14, as seen in FIG. 3A (in which arms 63 have pushed in the latches). The released food container is now supported on the second actuator 68 (by resting on arms 63 or by being grasped by arms 63).

Alternatively, the second actuator 68 may include a stripping element which is used to strip an individual animal food container 20 from the stack of containers. The stripping element may include, without limitation, a cam or similar element that pushes the individual container to release and strip it from the stack (similar to the action of a cartridge magazine in the magazine well of a handgun or rifle). In such an embodiment, it is possible to use just the first actuator 64 and strip the container from the stack without need for the second actuator. Depositing of the used food containers in the waste station may be accomplished by the cart with the used food container moving underneath the waste station, whereupon the used food container is forced up into the stack of used food containers.

Figure 4:
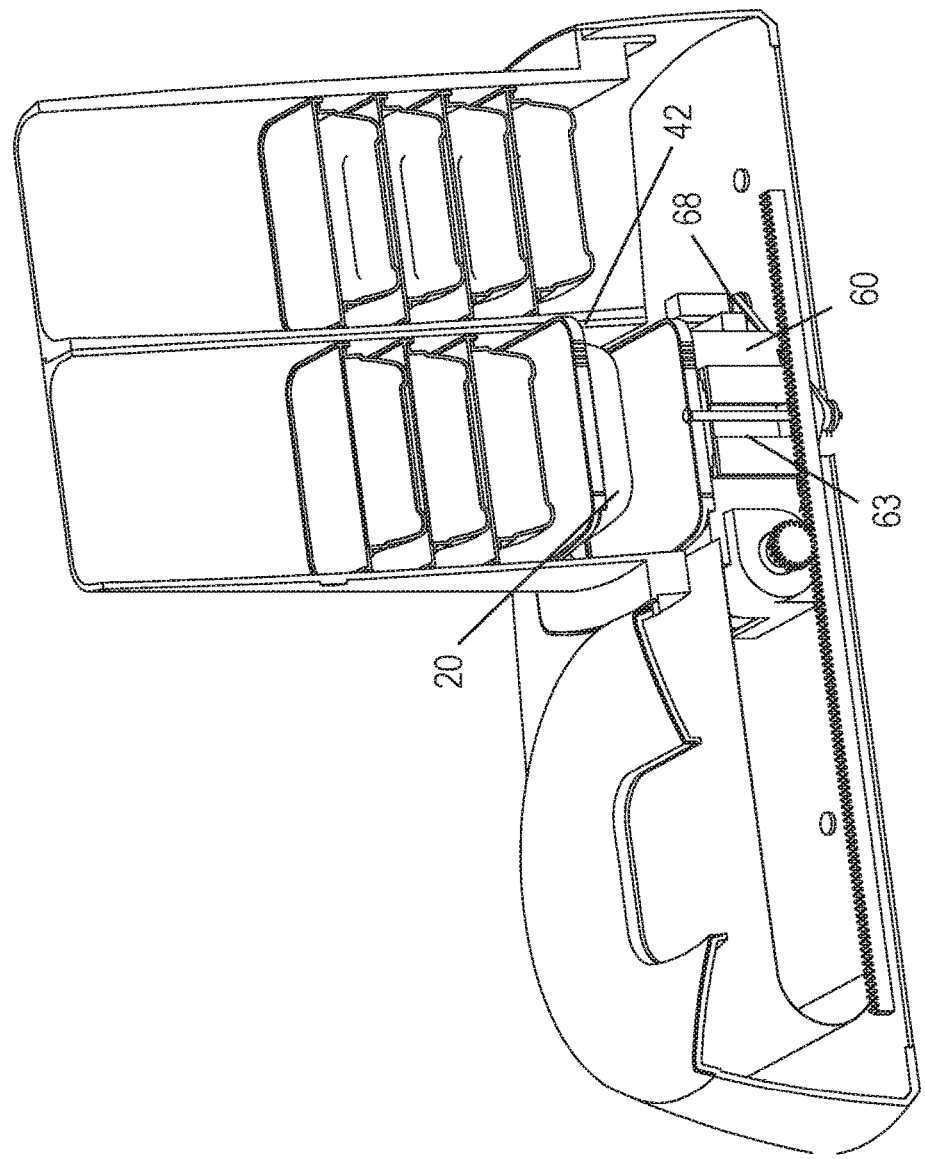
FIG. 4 is a simplified partially cutaway, pictorial illustration of the animal feeding system, wherein the elevator mechanism has been lowered to bring the released food container into the conveyor.
Figure 4A:
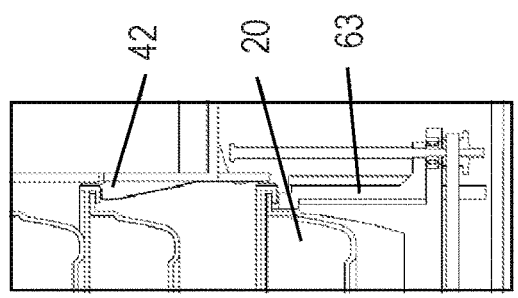
FIG. 4A is a simplified illustration of the next food container, right above the released food container, now supported by the supporting element (e.g., latch) in FIG. 4.

In FIG. 4, second actuator 68 has lowered arm(s) 63, thereby bringing down the released food container into the cart 60. Once the second actuator 68 starts the downward travel, the opened supporting element 42 (in the case of latches) are released and move back inward into the holding position. The next food container, right above the released food container, is now supported by the supporting element 42 as seen in FIG. 4A.

In FIG. 5, cart 60 has started moving forward together with the food container 20. The food container cover 22 is held in its position right below the food storage station 14 by stopper 46. Stopper 46 allows the food container 20 to pass right below it, but catches or retains cover 22 in its position while container 20 moves horizontally forward. This creates a relative horizontal sliding motion between food container 20 and cover 22. As mentioned above, a foil-seal 24 is attached to the top rim of the food container so as to seal, preferably hermetically, the food container. The foil-seal 24 is also attached or otherwise connected to the front portion of the cover 22. In this manner, the sliding motion between the food container 20 and the cover 22 pulls back the foil-seal 24, thereby causing a continuous peeling action of the foil-seal 24 off the top rim of the food container 20. FIG. 5 illustrates the foil-seal 24 partially peeled while the food container opening is in process.

In FIG. 6, cart 60 has reached the feeding position and stopped underneath feeding station 16. The foil-seal 24 is fully peeled and the food container 20 is fully opened.

It is noted that the front edge of the foil-seal 24 is still connected to the front portion of cover 22, while the back side of the foil-seal 24 is still connected to the back rim of food container 20. The foil-seal 24 is now flipped backward and its bottom side [food side] is now flipped to the top side. This keeps the foil-seal 24 stretched and flat, avoids twisting of the foil (peeled foils tend to twist and roll), and avoids dripping of gravy/oil or food residues attached to the foil. Alternatively, the seal 24 may be fully removed, detached or peeled.

Figure 7:
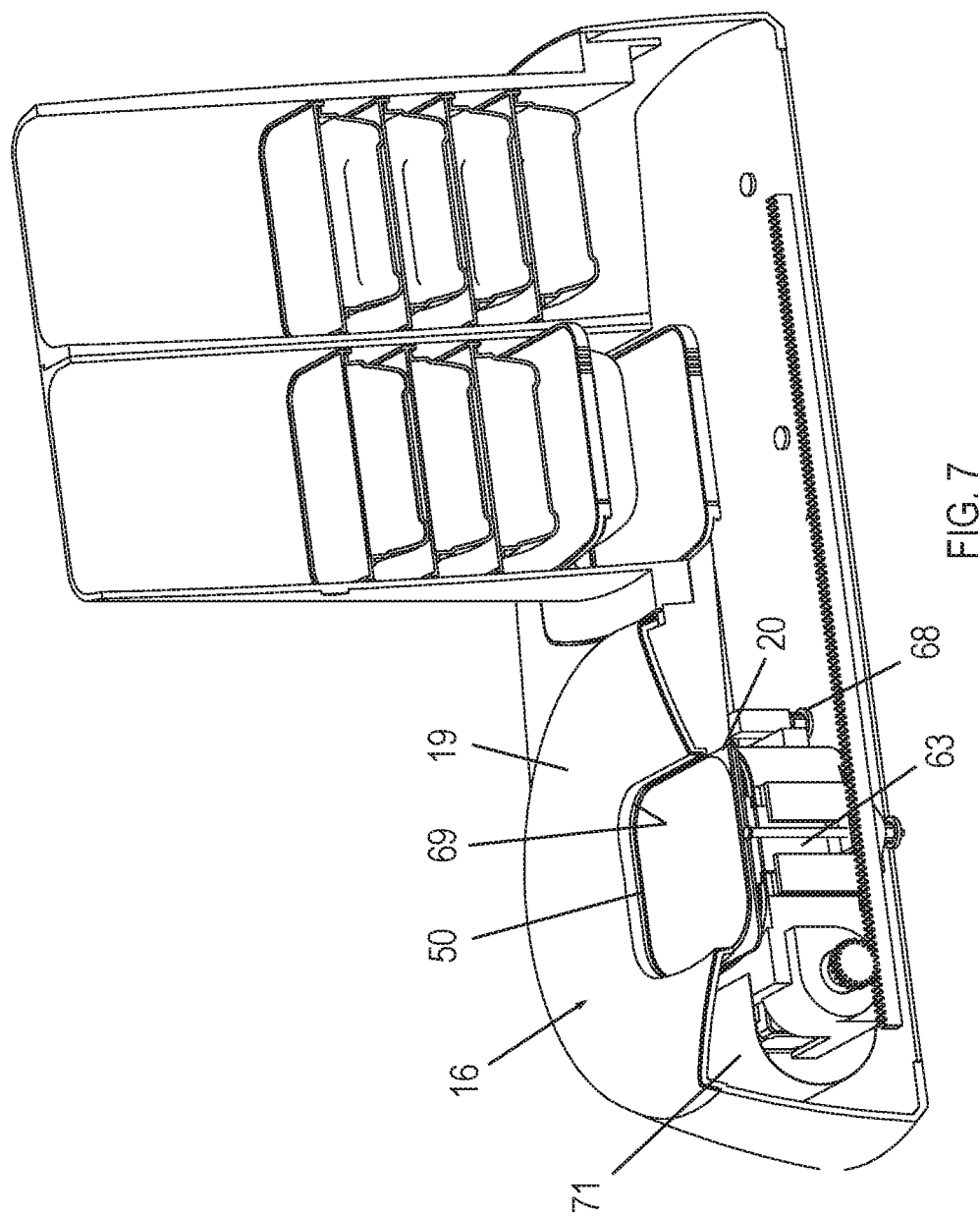
FIG. 7 is a simplified partially cutaway, pictorial illustration of the animal feeding system, wherein the elevator mechanism has been raised to move the food container flush against a feeding bowl to avoid any leakage of food substances between the container and the bowl, and the food container is ready for eating therefrom.

In FIG. 7, the second actuator 68 has lifted arms 63 so as to attach (e.g., fully press) food container 20 to the underside of upper bowl portion 19 to form the completed feeding bowl 16, thereby avoiding any penetration of food/oil/gravy in between the container 20 and the bowl 16. As mentioned above, seal 69 ensures sealing between food container 20 and bowl portion 19 once container 20 is pressed against bowl portion 19.

Optionally, a flap 71 may cover the opening of bowl portion 19 when the bowl is not in use and a food container 20 is not present. The flap 71 may cover the underside of the opening and is opened by the action of cart bringing the food container 20 to the opening. For example, the food container may simply move the flap 71 out of the way; the flap may be hinged or may fold or bend over as in a conveyor belt. Alternatively, the flap 71 may open by action of the controller 80, which synchronizes the opening of the flap with the arrival of the cart.

Once the food container 20 is attached to the bowl portion 19, the animal can come and eat. Controller 80 (FIG. 1) controls the logic and timing for withdrawing the food container 20, such as but not limited to, a function of time (e.g., average time for eating), food level sensor, pet presence sensor and others.

Figures 8, 17G:
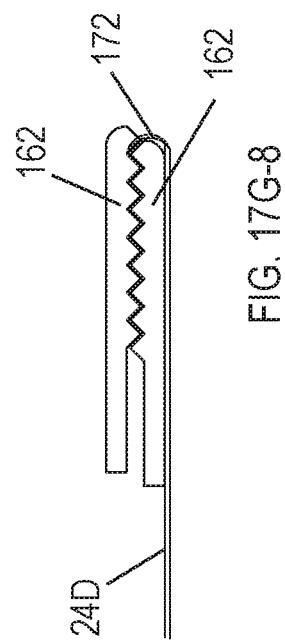
Figures 7, 17G:
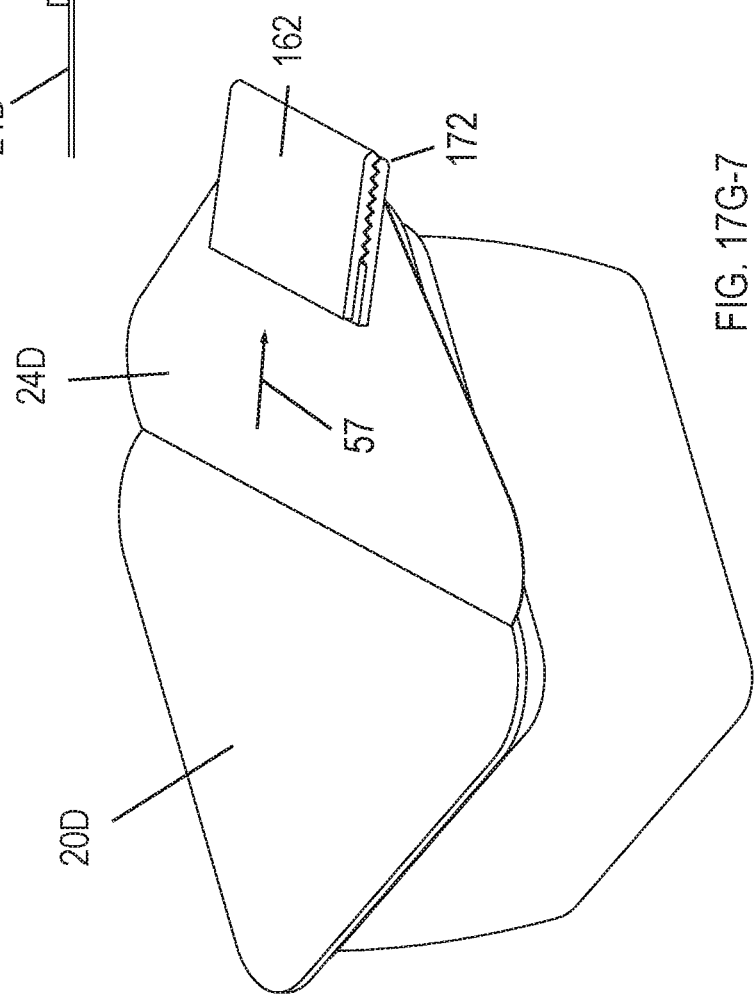

In FIG. 8, the second actuator 68 has lowered the arms to move the food container 20 down and away from the opening of the bowl portion 19.

In FIG. 9, cart 60 has moved backwards together with the consumed food container 20. Foil 24 has started to re-cover container 20 by the movement of the cart. (Optionally, an adhesive may assist in re-sealing the foil seal on the container rim, as described further below).

In FIG. 10, cart 60 and consumed food container 20 have moved back under food storage station 14, causing the cover 22 and/or seal 24 to re-cover and re-seal food container 20. Consumed food container 20 is sealed, or semi-sealed, to avoid any bad odor from food residues and avoid ingress of any insects, such as ants.

Once reaching this position, the cover 22 and/or seal 24 and container 20 are fully matched back together, but the cart 60 does not have to pause; instead cart 60 can continuously move towards waste station (canister) 12. Cover 22 and/or seal 24 is held in position until food container 20 is fully inserted back; after full insertion, cover 22 and/or seal 24 is free to move backwards together with consumed food container 20.

In FIG. 11, cart 60 and consumed food container 20 have moved back under waste station 12. Cart 60 has stopped at its original stand-by position, only this time it contains a used food container 20. FIG. 11A shows the position of arms 63.

In FIG. 12, second actuator 68 has lifted arms 63 so as to lift the consumed food container 20 past supporting element 32 (FIG. 12A) of waste station 12. The cart arm 63 supports the used food container 20 as seen in FIG. 12A.

Figure 13:
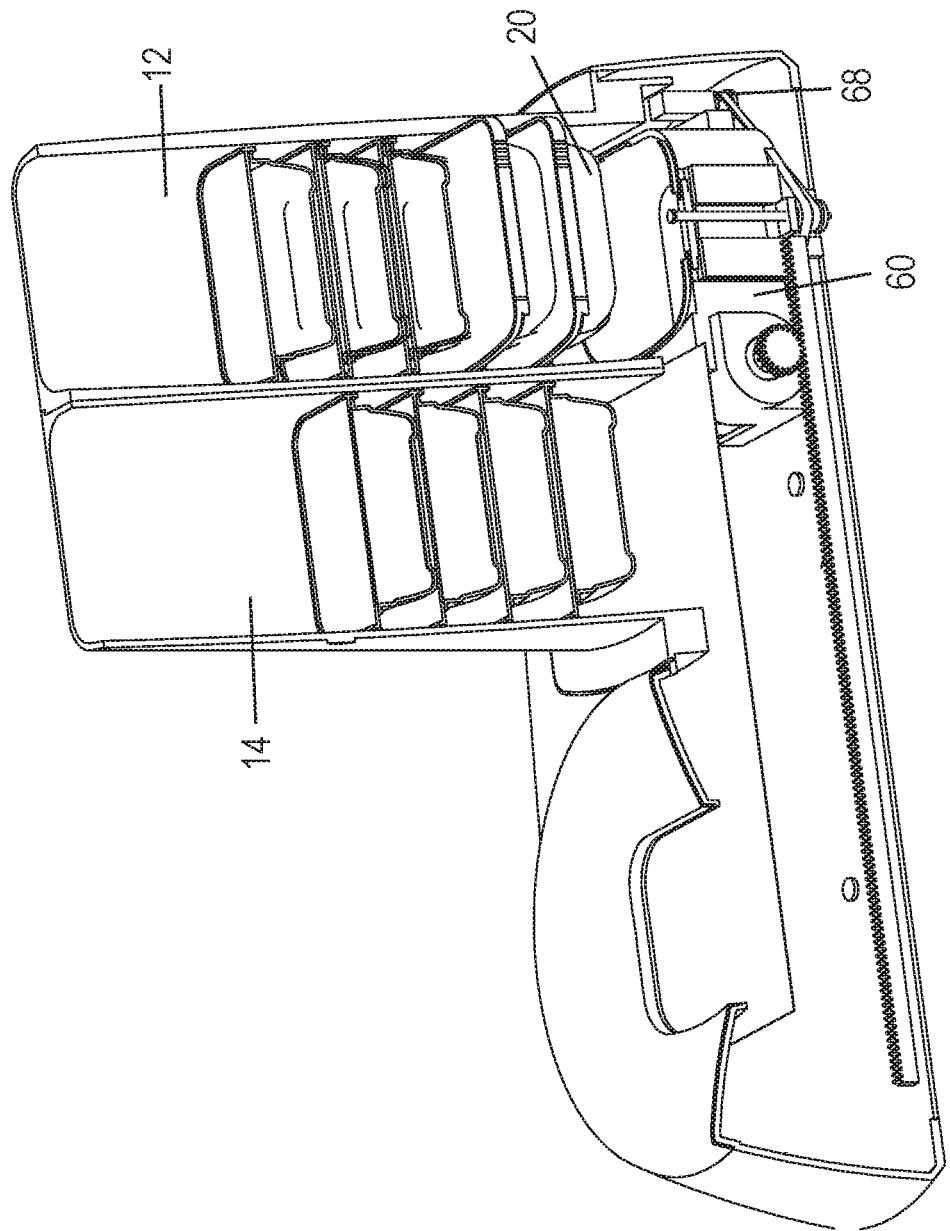
FIG. 13 is a simplified partially cutaway, pictorial illustration of the animal feeding system, wherein the elevator mechanism has moved down, the consumed food container is held within the waste station, and the conveyor is empty and in its original stand-by position for starting the cycle over again.
Figure 13A:
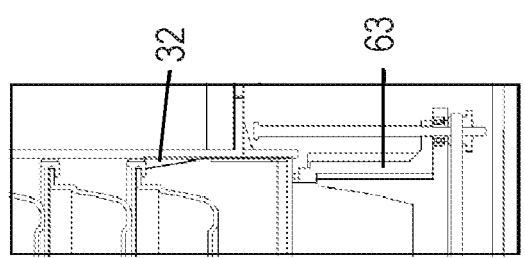
FIG. 13A is a simplified illustration of the consumed food container supported by the supporting element within waste station in FIG. 13.

In FIG. 13, second actuator 68 has moved arms 63 down, leaving the consumed food container 20 supported by supporting element 32 within waste station 12 as seen in FIG. 13A. Cart 60 is once again empty in its original stand-by position. The full feeding cycle is now completed, back to the stand-by position of FIG. 1 (except that now there is one less food container in food storage station 14, and one more consumed food container within waste station 12).

Reference is now made to FIGS. 17A-17I, which illustrate different kinds of food containers, in accordance with non-limiting embodiments of the invention. The containers may be of any size or shape, large or small, such as but not limited to, single serve containers, small size containers, large size containers, multiple compartment containers, etc. The containers may be covered with a cover, seal (e.g., foil), cover with seal, or others, and may have a variety of opening features.

FIGS. 17A, 17B and 17C illustrate a container 20A with a sliding cover 22A, respectively, in a closed position, partially opened position, and in a fully opened position. A seal 24A is gradually peeled from the container 20A to expose the contents for eating. After the container has been used, the container can be re-closed/re-sealed with seal 24A, as described above.

FIG. 17C illustrates food container 20A with the foil seal 24A peeled back. The foil seal 24A may be joined to the container top, such as by thermal or sonic welding or bonding along a line which forms the peeling line 174 on the container. A line of adhesive 176 may be provided for closing, sealing or partially sealing the foil seal 24A back on the container after use, as described above. Optionally, the foil seal 24A may be fully removed from container 20A.

It is noted that in FIGS. 17B and 17C, seal 24A is joined to container 20A (e.g., welding, adhesive or other manner) in such a manner so as to reduce the peeling force. For example, the point at which the peeling starts, shown by reference numeral 41 (FIG. 17B), is of minimum dimensions, such as a point, and the peeling line 174 between the seal and the container gradually widens from point 41 to the rest of the periphery of the container. (The leading edge that needs to be peeled is never perpendicular to the peeling direction 57, rather is kept at least at a small angle at all times.) For example, after point 41, the peeling line 174 may gradually widen as in an arrowhead shape (even with a small angle, e.g., 1°), or as shown in the FIG., the joint line is not straight perpendicular to the direction of peeling, but instead is rounded relative to the peeling direction, so that the peeling is done gradually so as to reduce the peeling force.

FIGS. 17D and 17E illustrate a container 20B with a cover 22B that may be raised upwards by opening mechanism 15, showing partially and fully opened positions, respectively. The opening mechanism grabs and lifts the cover 22B as the container moves past the opening mechanism. A seal 24B is gradually peeled from the container 20B to expose the contents for eating. Seal 24B can then be re-attached to container 20B, as described above.

FIG. 17F illustrates a food container 20C without a cover and only sealed with a foil seal 24C that has a rigid front edge 170. The front edge 170 may abut against the opening mechanism described above to open the container. Seal 24C can be opened and re-attached to container 20C, as described above.

FIGS. 17G-1 to 17G-4 illustrate different food containers 20D without a cover and only sealed with a foil seal 24D, each of which has a grabbing tab 172 at the front edge of foil 24D.

In FIG. 17G-1, the grabbing tab 172 may be made of a more rigid material than the foil seal 24D (or may be made of the same material and flexibility). The opening mechanism 15 may include a slot 171 in which tab 172 is received (or other suitable element for grasping the tab 172), as seen in FIG. 17G-2. As the container moves past the opening mechanism 15, tab 172 is gradually peeled away from the container to expose the contents for eating.

In FIG. 17G-3, the grabbing tab 172 may have a hole, slot or any other kind of opening 173 (the terms being used interchangeably throughout) formed therein. The opening mechanism 15 may include a pin 177 (or other suitable element for grasping the hole 173), which mates with the hole 173 of tab 172, as seen in FIG. 17G-4. As the container moves past the opening mechanism 15, tab 172 is gradually peeled away from the container to expose the contents for eating.

FIG. 17G-5 illustrates food container 20D, which is a generally rectangular container with foil seal 24D. Food container 20D may be made in other shapes, even circular. This container configuration is commonly used in pet food containers presently on the market, with and without a cover. As seen in FIGS. 17G-6, 17G-7 and 17G-8, container 20D may be presented to the opening mechanism 15 such that the container is positioned at an angle relative to the peeling direction 57 (e.g., 45°), so that the grabbing tab 172 of seal 24D can be grabbed by pincer jaws 162 and peeled off the container 20D so that the force required to peel the seal is greatly reduced, as similarly described above with reference to FIGS. 17B-17C. Pincer jaws 162 may be serrated or roughened to increase friction and holding force of the jaws. Food container 20D (e.g., pet food containers used in the market) may be oriented in food station 14 at an angle (e.g., 45°) such that the grabbing tab 172 is already properly oriented for easy grabbing and peeling as described above.

Figures 2, 17H:
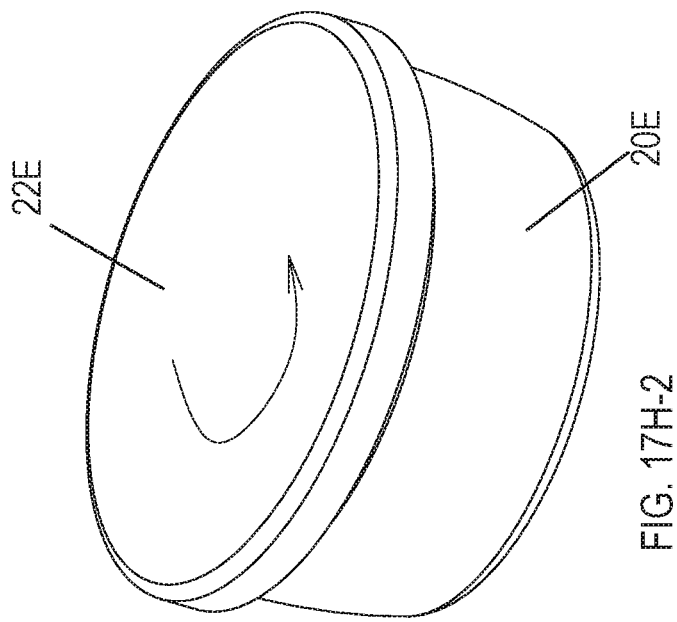
Figures 1, 17H:
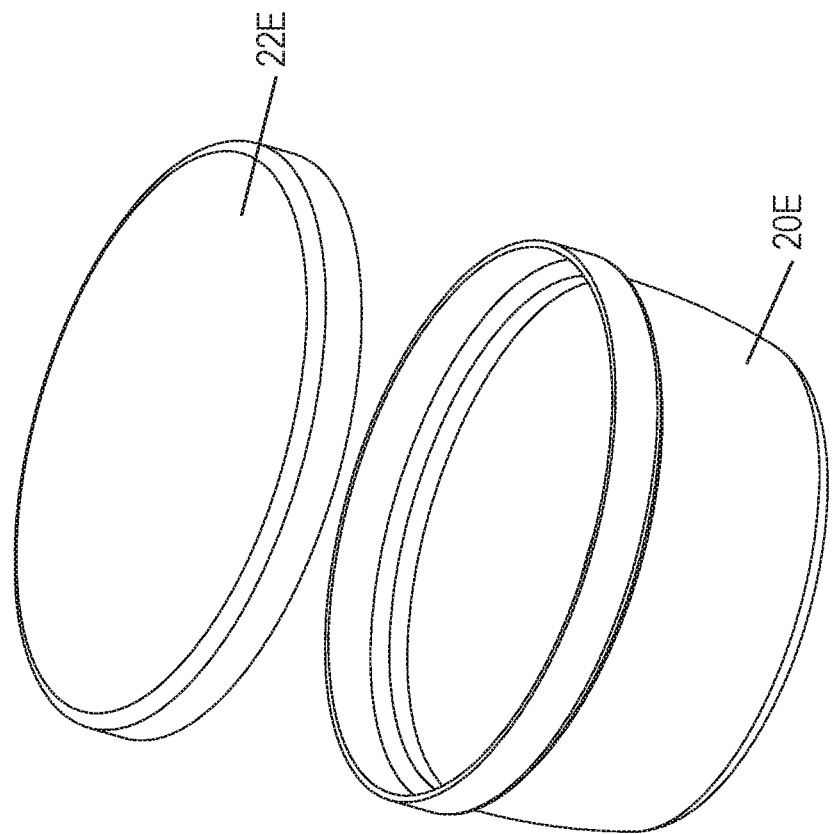

FIG. 17H-1 and 17H-2 illustrate a food container 20E, which has a round or circular shape with a rotatable cover and/or cover seal 22E. In such an embodiment, the opening mechanism may grab cover 22E and rotate or twist the cover off the container to expose the contents for eating. Food container 20E may come with or without a foil seal. If there is a foil seal, the opening mechanism opens the seal, such as by peeling or tearing or any other suitable means. The peeling can be done simultaneously with opening the cover or may be done gradually as the cover is opened.

Figure 17I:
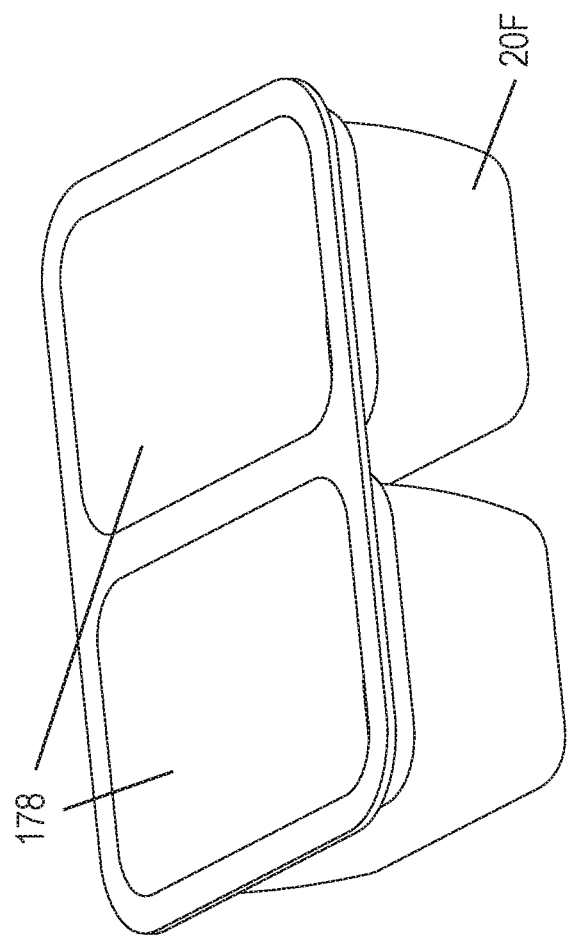

FIG. 17I illustrates a food container 20F, which has multiple food receptacles (cavities) 178, such as for wet food and dry food in different receptacles.

In all the embodiments of the invention, the food container is opened by movement relative to the opening mechanism, such as wherein the food container moves relative to a stationary opening mechanism, or the opening mechanism moves relative to a stationary food container, or both the food container and the opening mechanism move during opening of the food container.

Reference is now made to FIGS. 18A-18D, which illustrate a manually operated animal feeding system 180, constructed and operative in accordance with a non-limiting embodiment of the invention.

Figure 18A:
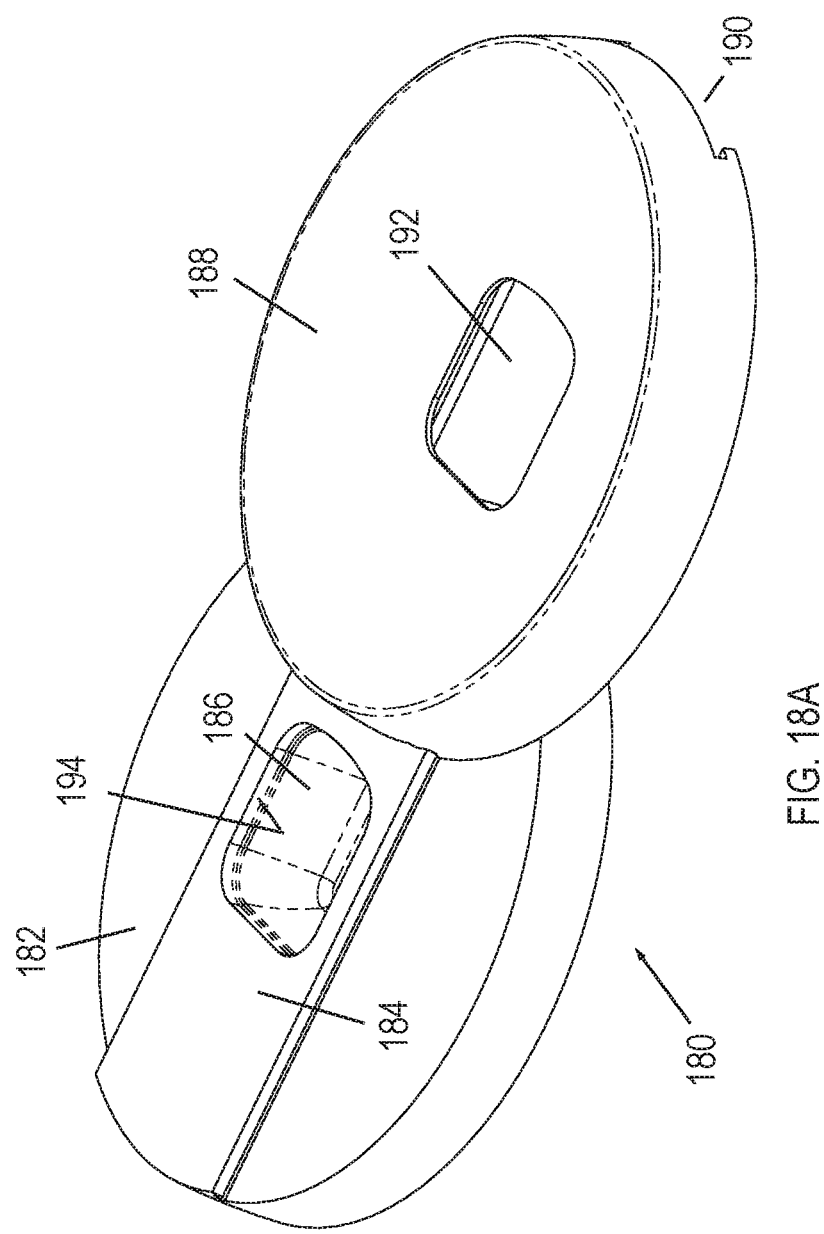

In the illustrated embodiment shown in FIG. 18A, system 180 includes a lower portion 182 that has a lower channel member 184 and a lower aperture (opening, the terms being used interchangeably) 186 formed through channel member 184 and lower portion 182. An upper portion 188 has an upper channel member 190 that slidingly mates with the lower channel member 184. In the illustrated embodiment, the lower channel member 184 is male and the upper channel member 190 is female; alternatively the reverse may be provided. An upper aperture 192 is formed through upper channel member 190 and upper portion 188, alignable with the lower aperture 186.

Figure 18C:
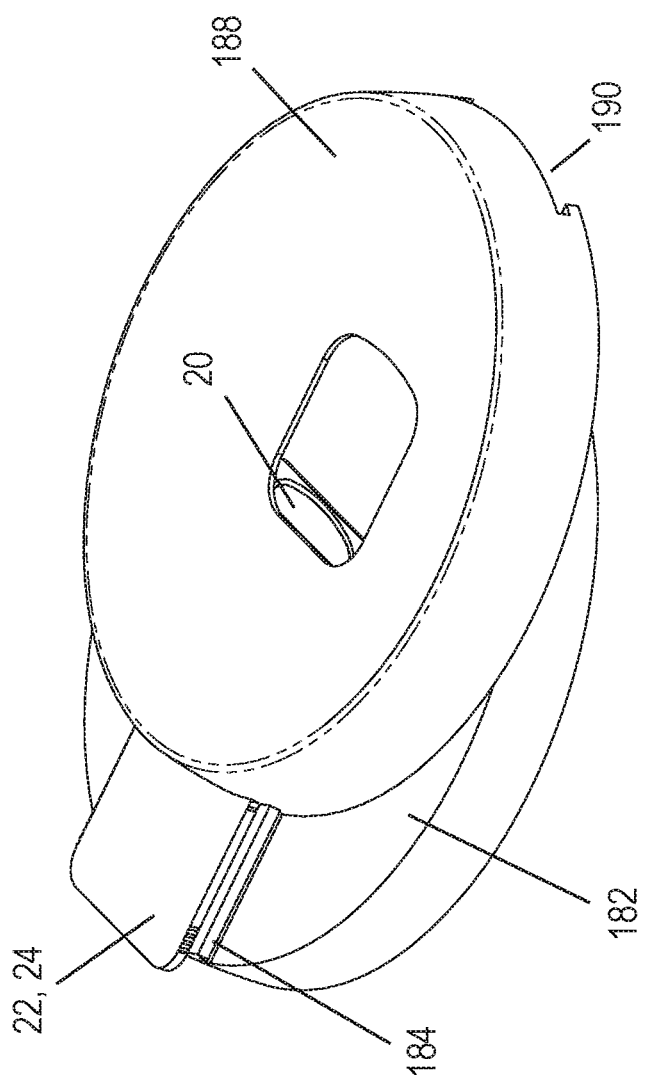
Figure 18D:
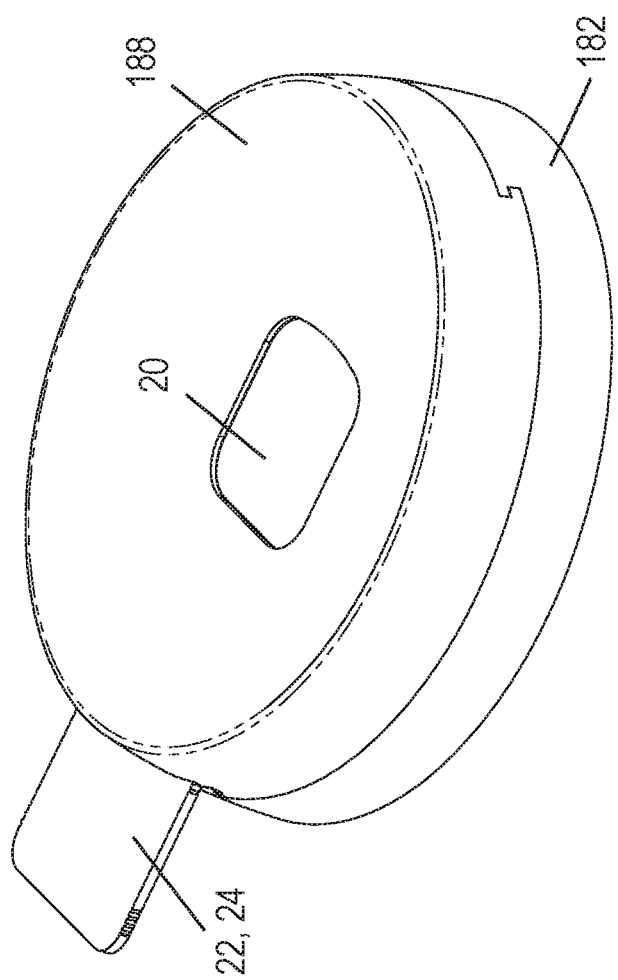

In FIG. 18B, a food container 20 with cover 22 and seal 24 is placed and held in lower aperture 186. As seen in FIGS. 18C-18D, upper portion 188 is gradually slid over lower portion 182, with upper channel member 190 sliding over the lower channel member 184. As upper portion 188 slides over the lower portion 182, the leading edge of upper portion 188 or any other opening mechanism abuts against the front edge of the cover 22 and/or seal 24 of the container 20 and peels the cover 22 and/or seal 24 at least partially off the container 20, as described above. The food container 20 and system 180 thus form a fully assembled feeding bowl ready for use as seen in FIG. 18D. After use, upper channel member 190 may be slid over the lower channel member 184 in the opposite direction, back to the position shown in FIG. 18B, wherein the used food container 20 is closed back (to block any odors from exiting therefrom and any insects or pests from entering therein) and may be easily removed and discarded.

An elastomer seal 194 (FIG. 18A) may be optionally provided around the bottom rim of the lower aperture 186 or upper aperture 192 to ensure sealing between food container 20 and lower portion 182.

As seen in FIGS. 19A-19E, the container 20G may turn into bowl once it has been opened. It is noted that additionally or alternatively the container may change its shape upon opening. For example, the container may be folded (e.g., origami folds) to save space and open up to the unfolded configuration of a serving bowl. Upon unfolding (deployment), the previously folded device opens and spreads out to resemble a plate or bowl, such as with a wide rim that helps catch food from scattering about.

Figure 19A:
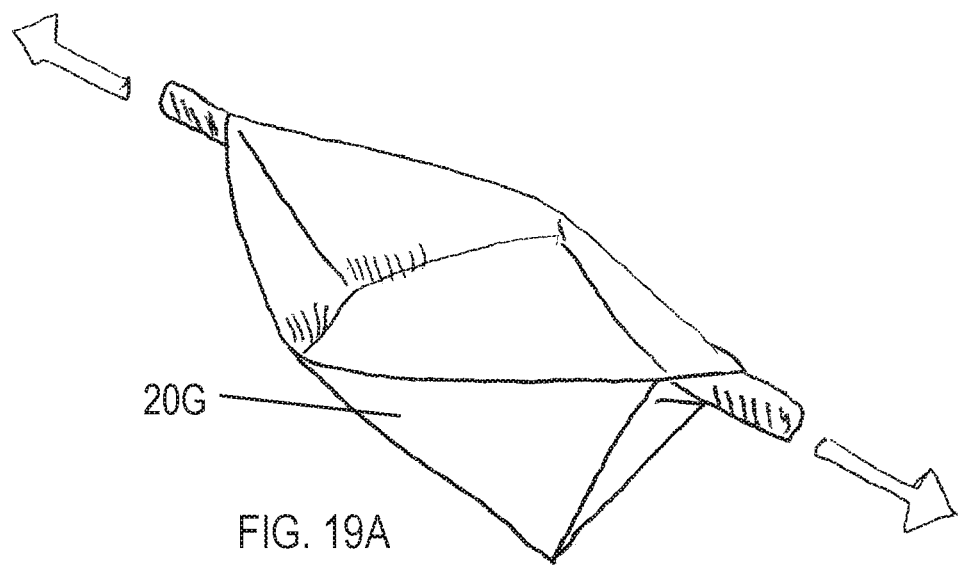
FIGS. 19A-19E are simplified illustration of folded containers being opened into serving containers, in accordance with different embodiments of the invention.
Figure 19B:
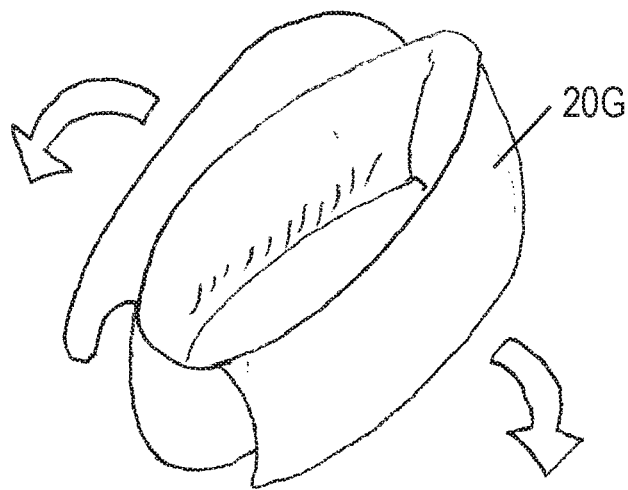

As seen in FIG. 19B, in one example, the folded device is opened outwards from the top-center. In another example, shown in FIG. 19E, the folded device is opened upwards from the outer sides. After serving, the container can be folded back downwards to a compact folded configuration to save on volume when discarded in the garbage.

Figure 19C:
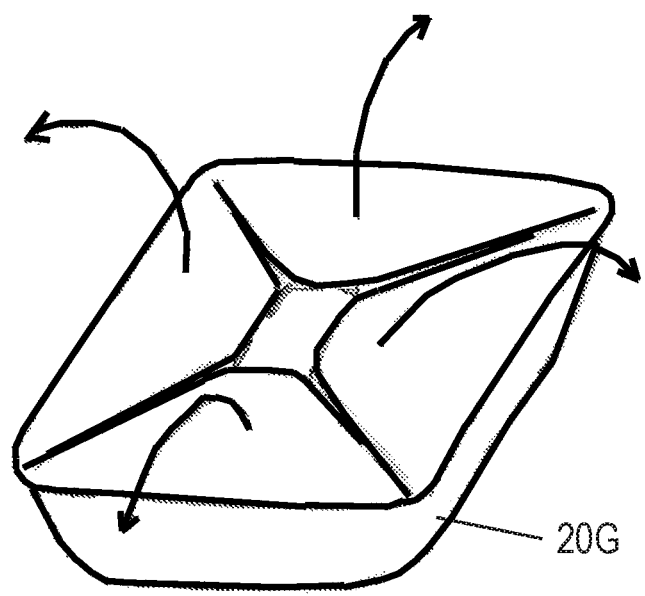
Figure 19D:
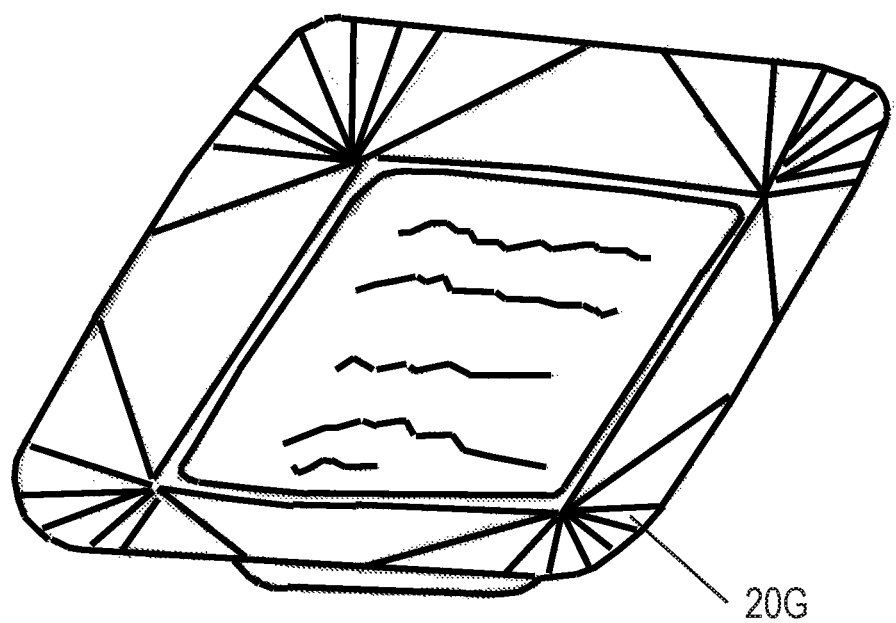

In FIG. 19C, the folded container has an inwardly folded rim. As seen in FIG. 19D, the rim is unfolded, which opens the container for serving with wide rims for preventing scattering of food.

Figure 19E:
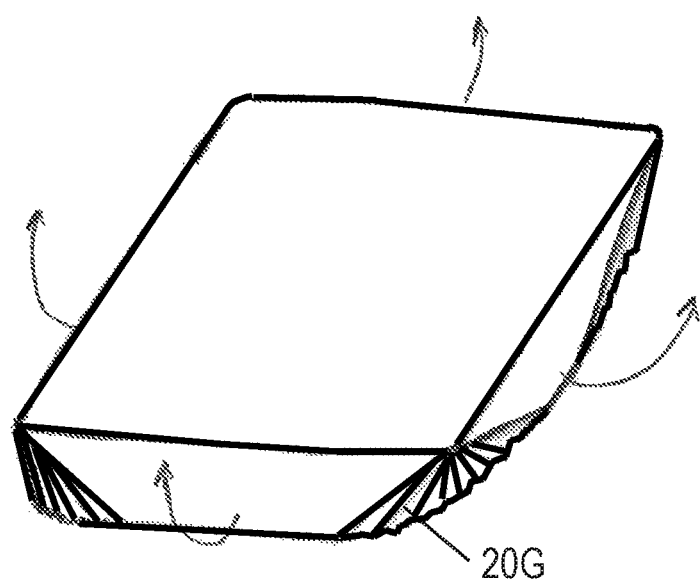

In FIG. 19E, the folded container has an outwardly folded rim (which is unfolded in the upwards direction). In the embodiment of FIGS. 19A-19E, a cover seal and/or cover may be peeled off or otherwise removed separately.

In all embodiments, the container may be unfolded and subsequently folded back to the original position; alternatively, the container may be folded outwards prior to serving and then (after serving) folded inwards, or vice versa, or any combination of the above. The container in the folded configuration saves on storage space and shipping; when re-folded after use, the folded configuration further serves to provide a sanitary way of disposing the container without causing pest and/or germ problems.

Optionally, the food may be split, chopped, diced or cut once the container has been opened and served. This may be accomplished by a mechanical element within the container or container cover/seal, by an external mechanism that may be contained in or part of the feeder assembly, by squashing or pushing the bottom of container once opened and the like. For example, the cover of the container may be formed with protrusions (e.g., cookie-cutter type protrusions or any other kind of cutting protrusion), whereupon suitable movement of the cover (such as during removal of the cover) the cutting protrusions cut, chop or otherwise reduce the size of the food stored in the container.

Optional features include, without limitation, wireless communication with feeder (Wi-Fi, Bluetooth, NFS, cellular, internet connectivity), or wire communication connection (e.g., USB). A pet presence sensor may be used to detect the presence of the pet and commence the feeding process. A level sensor may be provided to detect the amount of food consumed from the container (e.g., an optical detector, RFID, or a load cell for weighing the food). The level sensor may be used to detect the amount of food presented originally to the animal along with a timer that records when the food was initially presented to the animal. The level sensor and the timer may then detect the level of food after a certain amount of time. This information may be used to determine the preferences of the animal. For example, if the animal (e.g., Flusky), ate a large amount of food in a short time, this may be an indication that the animal likes the food (perhaps taking into consideration other factors, such as a determination of how starved the animal was prior to eating). The level sensor may detect if the animal left no or very few morsels or crumbs (an indication that the animal licked the serving container.) Conversely, if the animal ate a small amount of food in a long time, this may be an indication that the animal dislikes the food. The system may develop a ranking of food preferences based on a statistical evaluation of the animal's behavior over a period of time.

Thus, in general, sensors may be provided to detect the animal's preferences in order to detect which foods are well-liked and which are less-liked. The sensor may detect the pet eating time and enthusiasm. This may be used to establish a food liking/ranking measure, which information may be stored and analyzed/processed locally or remotely (such as by a server in a service provided over the internet) to determine the animal's food preferences and provide information to the animal owner for future purchases of food. The animal's food preferences can be determined by a combination of time to approach the food, time of feeding, level of finishing/completing/cleaning (e.g., licking the bowl).

Sensors may be provided for pet eating alerts. For example, the sensors may detect abnormal eating behavior (e.g., low/no appetite/illness detection, etc.), and may also provide pet eating statistics. The statistical data is relevant for food type/flavor liking ranking. For example, the system processes the statistical data, and general and specific animal behavior patterns as sensed by the sensors, and "learns", calculates and stores in memory "food liking" rankings and information. "Food liking" may be determined by an algorithm that takes into consideration various factors and parameters, such as but not limited to, the time the animal takes to approach the food (the quicker the animal approaches the food, the greater the food-liking); the amount of time spent consuming the food (the quicker the animal eats, the greater enthusiasm the animal has for the food); the amount of food left over, if any, in the container (the less food left over, the greater enthusiasm the animal has for the food). Sensors sensing/tracking animal approaching the food and/or feeder, and/or sensors sensing the level of food left in the container, can provide the necessary parameters/statistical-data for these "food liking" measurements.

The animal feeding system 10 may include multiple feeders for feeding more than one pet. The eating time may be synchronized in accordance with any feeding plan. The synchronization feature may be used to synchronize separate feeders within the same household for serving a number of pets.

The animal feeding system 10 may provide voice announcements for feeding time (e.g., including the owner's voice. Voice recording feature may be included).

The animal feeding system 10 may include sensors for personalizing the feeder. For example, the sensors may detect which animal has come to the feeder (e.g., the sensor may identify an RF tag on the animal) and serve only a specific pet. The feeding mechanism will not operate and may retract the served container if the animal is not authorized, thereby preventing serving food to stray animals and for making sure that all pets are fed avoiding a dominate pet from over taking other pet's food.

The animal feeding system 10 may have a modular structure with easily removed cover and parts for easy cleaning of the pet feeding area (external parts of the feeder accessible to pet).

In accordance with another embodiment of the invention, the system may be used for inventory and purchasing of animal food. For this purpose, the system uses various sensors mentioned above (e.g., food level sensor, food type sensors, timers and other food preference sensors) together with a control system which is in communication with a local or remote logistic/fulfillment center (via wireless and/or internet communication). For example, the system may define the desired food inventory by type & flavor (e.g., as defined by the user). The system senses the type or flavor of the served food capsules (e.g., as sensed by the feeder). The system processes the sensed data and automatically calculates the current level of user inventory (e.g., may be done by a user application on the user's home computer/smartphone/or by the feeder itself). The system then calculates the required amounts of food necessary for refreshing the stock of food, and automatically places orders for the desired food. The customer may be provided with a notification (via smartphone or computer) and may approve any specific ordering. Alternatively, the process may be fully automatic, with or without notification.

What is claimed is:

1. A method of feeding an animal comprising:
    employing an animal feeding system to take a closed food container containing animal food from a stack of food containers and open the food container and present the food to an animal for eating; and
    employing the animal feeding system to re-close the food container.

2. The method according to claim 1, wherein the re-closing is sufficient against ingress of insects.

3. The method according to claim 1, wherein the re-closing is sufficient to prevent odors from exiting the food container.

4. The method according to claim 1, wherein presenting the food to the animal for eating comprises moving the food container to be attached to a feeding station.

5. The method according to claim 1, further comprising using a sensor to provide inventory information of different types of food available for feeding the animal.

6. The method according to claim 5, further comprising ordering purchases of animal food in accordance with the inventory information.

7. The method according to claim 1, further comprising using a sensor to read a readable code on the food container for recognizing a type of food or a type of container.

8. The method according to claim 7, wherein if the code is authorized the food container is permitted for use with the system and if the code is not authorized the food container is not permitted for use with the system.

9. A method of feeding an animal comprising:
    placing a closed food container containing animal food in an animal feeding system;
    employing the animal feeding system to open the food container and to present the food to an animal for eating; and
    employing the animal feeding system to re-close the food container, and using the animal feeding system to place the food container in a waste station for used food containers.

* * * * *